(12) United States Patent
Shaeffer

(10) Patent No.: US 9,176,908 B2
(45) Date of Patent: Nov. 3, 2015

(54) TIME MULTIPLEXING AT DIFFERENT RATES TO ACCESS DIFFERENT MEMORY TYPES

(75) Inventor: Ian Shaeffer, Los Gatos, CA (US)

(73) Assignee: Rambus Inc., Sunnyvale, CA (US)

( * ) Notice: Subject to any disclaimer, the term of this patent is extended or adjusted under 35 U.S.C. 154(b) by 311 days.

(21) Appl. No.: 13/578,736

(22) PCT Filed: Nov. 23, 2010

(86) PCT No.: PCT/US2010/057902
§ 371 (c)(1),
(2), (4) Date: Aug. 13, 2012

(87) PCT Pub. No.: WO2011/106049
PCT Pub. Date: Sep. 1, 2011

(65) Prior Publication Data
US 2012/0311371 A1 Dec. 6, 2012

Related U.S. Application Data

(60) Provisional application No. 61/307,336, filed on Feb. 23, 2010.

(51) Int. Cl.
*G06F 13/16* (2006.01)
(52) U.S. Cl.
CPC .................................. *G06F 13/1694* (2013.01)
(58) Field of Classification Search
CPC .................................................. G06F 13/1694
See application file for complete search history.

(56) References Cited

U.S. PATENT DOCUMENTS

| | | | | |
|---|---|---|---|---|
| 4,771,279 | A | * 9/1988 | Hannah | 345/559 |
| 5,502,752 | A | * 3/1996 | Averbuch et al. | 375/377 |
| 5,991,841 | A | 11/1999 | Gafken et al. | |
| 6,134,638 | A | 10/2000 | Olarig et al. | 711/167 |
| 6,457,074 | B1 | * 9/2002 | Gaillard et al. | 710/25 |
| 6,480,929 | B1 | 11/2002 | Gauthier et al. | 711/105 |
| 6,636,907 | B1 | * 10/2003 | Gaillard et al. | 710/25 |
| 6,742,098 | B1 | 5/2004 | Halbert et al. | 711/172 |

(Continued)

FOREIGN PATENT DOCUMENTS

| | | |
|---|---|---|
| JP | 2001-517834 A | 10/2001 |
| JP | 2005-301739 A | 10/2005 |
| JP | 2006-350965 A | 12/2006 |

OTHER PUBLICATIONS

PCT International Search Report and the Written Opinion dated Jul. 1, 2011 re Int'l Application No. PCT/US2010/057902. 11 Pages.

(Continued)

*Primary Examiner* — Cheng-Yuan Tseng
*Assistant Examiner* — Rocio Del Mar Perez-Velez
(74) *Attorney, Agent, or Firm* — The Neudeck Law Firm, LLC

(57) ABSTRACT

A memory controller accesses different types of memory devices running at different native rates through the use of a time division multiplexed bus. Data is transferred over the bus at one rate when accessing one type of memory device and at a different rate when accessing another type of memory device. In addition, the memory controller may provide control information (e.g., command and address information) to the different types of memory devices at different rates and, in some cases, time multiplex the control information on a shared bus.

17 Claims, 25 Drawing Sheets

(56) References Cited

U.S. PATENT DOCUMENTS

| | | | |
|---|---|---|---|
| 7,380,035 B1 | 5/2008 | Donlin | 710/123 |
| 2003/0035142 A1 | 2/2003 | Kizaki | 358/1.16 |
| 2003/0188141 A1* | 10/2003 | Chaudhry et al. | 712/235 |
| 2004/0225860 A1 | 11/2004 | Ahvenainen et al. | 711/212 |
| 2004/0236894 A1 | 11/2004 | Grundy et al. | 711/1 |
| 2005/0062699 A1* | 3/2005 | Kobayashi | 345/87 |
| 2005/0088896 A1 | 4/2005 | Yeh | |
| 2006/0004976 A1 | 1/2006 | Rader | 711/167 |
| 2006/0168416 A1 | 7/2006 | Kessels et al. | 711/167 |
| 2007/0064839 A1* | 3/2007 | Luu | 375/340 |
| 2007/0288683 A1 | 12/2007 | Panabaker et al. | 711/101 |
| 2008/0155187 A1 | 6/2008 | Skerlj | 711/105 |
| 2008/0165907 A1* | 7/2008 | Sobchak et al. | 375/355 |
| 2009/0024790 A1 | 1/2009 | Rajan et al. | 711/105 |
| 2009/0177909 A1 | 7/2009 | Tahara | |
| 2009/0219779 A1 | 9/2009 | Mao et al. | 365/233.11 |

OTHER PUBLICATIONS

EP Official Communication dated Jul. 1, 2013 in EP Application No. 10846793.7. 6 pages.

EP Response dated Oct. 15, 2013 in EP Application No. 10846793.7, Includes New Description pp. 1 and 2 (Clear and Highlighted copies). 9 pages.

International Preliminary Report on Patentability (Chapter I) dated Sep. 7, 2012 in International Application No. PCT/US10/057902. 8 pages.

\* cited by examiner

|   | BIT 0 | BIT 1 | BIT 2 | BIT 3 | BIT 4 | BIT 5 |
|---|---|---|---|---|---|---|
| T(N)   | OP 0 | OP 1 | OP 2 | X   | CS 0 | CS 1 |
| T(N+1) | C 1  | C 2  | BA 0 | BA 1 | BA 2 | X    |
| T(N+2) | AP   | C 3  | C 4  | C 5 | C 6  | X    |
| T(N+3) | C 7  | C 8  | C 9  | X   | X    | X    |

FIG. 8A

| OP 2 | OP 1 | OP 0 |   |
|---|---|---|---|
| 0 | 1 | 0 | READ |
| 1 | 0 | 0 | WRITE |
| ⋮ | ⋮ | ⋮ | ⋮ |

FIG. 9A

|   | BIT 0 | BIT 1 | BIT 2 | BIT 3 | BIT 4 | BIT 5 |
|---|---|---|---|---|---|---|
| T(N)   | OP 0 | OP 1 | X   | X   | CS 1 | CS 2 |
| T(N+1) | A 0  | A 1  | A 2 | A 3 | A 4  | X    |
| T(N+2) | A 5  | A 6  | A 7 | A 8 | A 9  | X    |

FIG. 8B

| OP 1 | OP 0 |   |
|---|---|---|
| 0 | 1 | READ |
| 1 | 0 | WRITE |
| ⋮ | ⋮ | ⋮ |

FIG. 9B

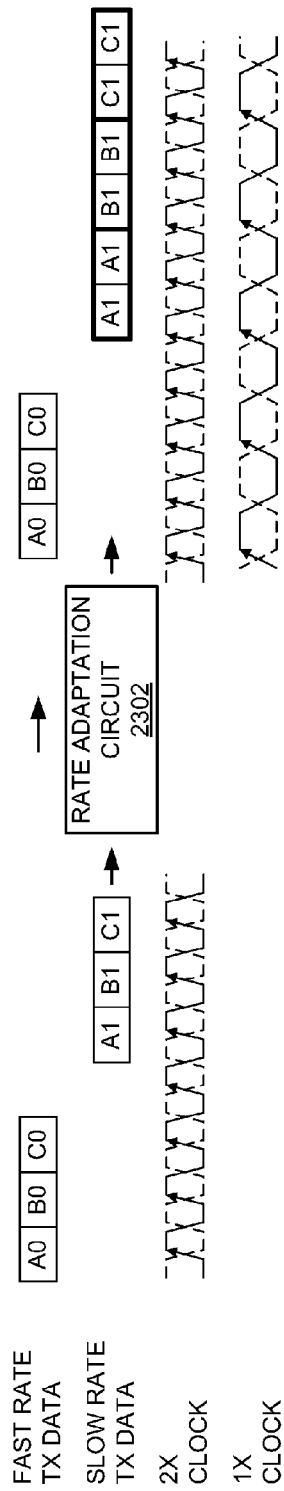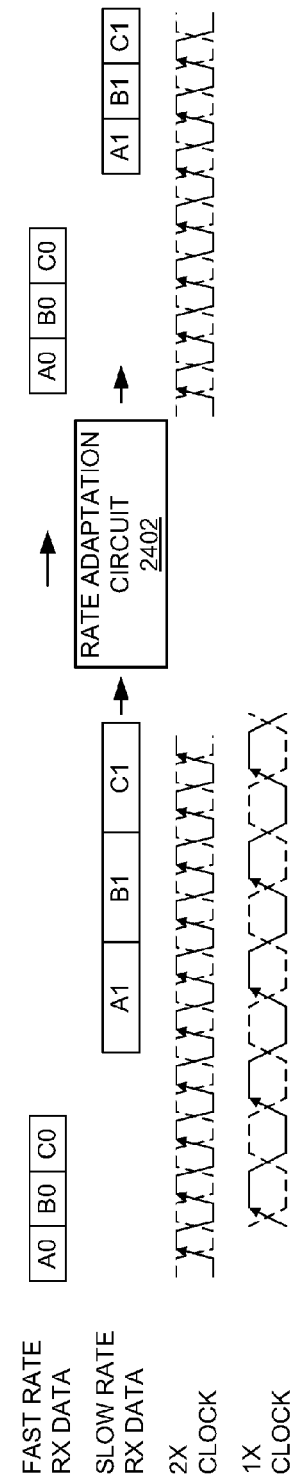

TIME MULTIPLEXING AT DIFFERENT RATES TO ACCESS DIFFERENT MEMORY TYPES

CLAIM OF PRIORITY

This application claims the benefit of and priority to commonly owned U.S. Provisional Patent Application No. 61/307,336, filed Feb. 23, 2010, the disclosure of which is hereby incorporated by reference herein.

TECHNICAL FIELD

This application relates generally to memory technology and more specifically, but not exclusively, to employing time multiplexing at different rates to access different types of memory.

BACKGROUND

Different types of memory technology may be used in a data processing system to store different types of data to optimize the performance, cost, or other characteristics of the system. For example, data that needs to be retained when a system is powered off may be stored in a nonvolatile memory such as flash memory. In contrast, data that needs to be written to and read out from memory relatively quickly, but does not need to be retained when a system is powered off, may be stored in a volatile memory such a random access memory (RAM) that provides fast access times. Also, large amounts of data may be stored in memory that provides a high storage capacity-to-cost ratio.

In some systems, more than one type of memory may be used in a single system component. For example, mobile devices (e.g., phones, personal data assistants, personal entertainment devices) may employ flash memory (e.g., NOR and/or NAND flash) and RAM. Since these different types of memory may have significant differences in their maximum input/output (I/O) transfer rates, optimum interface layout, or other characteristics, the memory controller in such a device may have a separate dedicated interface for accessing each type of memory. Consequently, such a memory controller may have a relatively large number of I/O pins which increases the cost and size of the memory controller.

BRIEF DESCRIPTION OF THE DRAWINGS

Sample features, aspects and advantages of the disclosure will be described in the detailed description and appended claims that follow and the accompanying drawings, wherein:

FIGS. 8A and 8B are simplified diagrams illustrating sample aspects of protocol structures for different types of memory devices;

FIGS. 9A and 9B are simplified diagrams illustrating sample opcodes for different types of memory devices;

FIG. 23 is a simplified diagram of an embodiment of rate adaptation scheme for a write operation;

FIG. 24 is a simplified diagram of an embodiment of rate adaptation scheme for a read operation;

Figure 1:
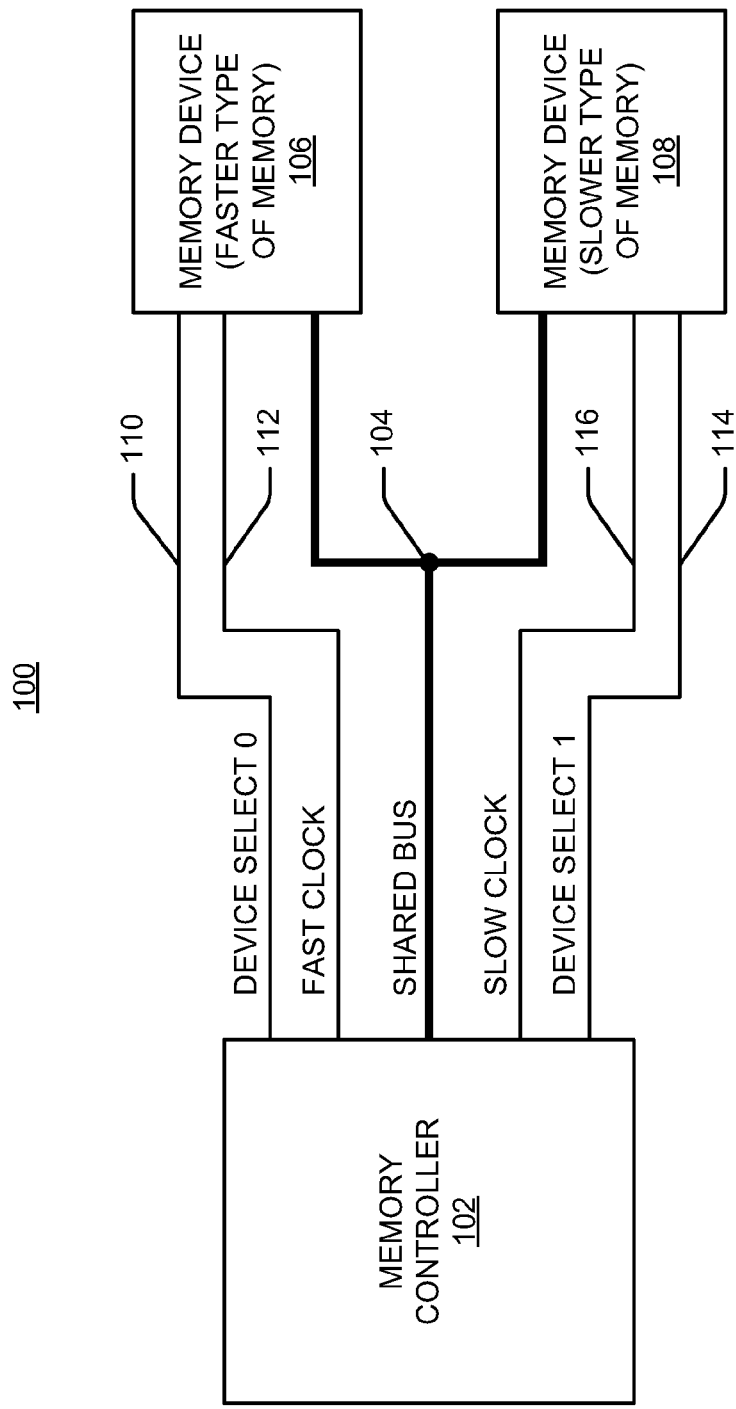
FIG. 1 is a simplified block diagram of an embodiment of a memory system where different types of memory are accessed at different rates via a time division multiplexed signal bus.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

FIG. 1 depicts an embodiment of a memory system 100 where a memory controller 102 accesses different types of memory devices at different rates via a shared bus 104. In this example, data is written to and read from a memory device 106 (e.g., DRAM) via the shared bus 104 at one rate while data is written to and read from a memory device 108 (e.g., flash memory) via the shared bus 104 at another rate. In some implementations the rate at which the memory device 106 operates may be an integer multiple (e.g., two times, three times, or four times) of the rate at which the memory device 108 operates. Different relative rates (e.g., including non-integer multiples), a different number of memory types, and a different number of memory devices may be employed in other embodiments in accordance with the teachings herein.

Data output at the different rates by the memory controller or the memory devices 106 and 108 is time division multiplexed over the shared bus 104 by enabling the memory devices 106 and 108 on the shared bus 104 on a mutually exclusive basis. For example, during a write to the memory device 106, the memory controller 102 enables a device select 0 signal 110, provides a clock signal 112 (e.g., having a relatively fast clock rate corresponding to a native rate of the memory device 106), and outputs control information and data onto the shared bus 104 at a rate corresponding to the clock signal 112. Similarly, during a write to the memory device 108, the memory controller 102 enables a device select 1 signal 114, provides a clock signal 116 (e.g., having a relatively slow clock rate corresponding to a native rate of the memory device 108), and outputs data onto the shared bus 104 at a rate corresponding to the clock signal 116. During a read from the memory device 106, the memory controller 102 enables the device select 0 signal 110, provides the clock signal 112, and outputs control information onto the shared bus 104, whereupon the memory device 106 outputs data onto the shared bus 104 at a rate corresponding to the clock signal 112. During a read from the memory device 108, the memory controller 102 enables the device select 1 signal 114, provides the clock signal 116, and outputs control information onto the shared bus 104, whereupon the memory device 108 outputs data onto the shared bus 104 at a rate corresponding to the clock signal 116.

Through the use of time division multiplexing at different rates as taught here, a memory controller may be implemented with substantially fewer I/O pins as compared to a memory controller that includes separate dedicated interfaces for different types of memory. For example, if 16 I/O pins are used to send data between the memory controller and a given memory device, there may be at least 16 fewer I/O pins on a memory controller as taught herein since the corresponding 16 signal paths are shared by the different types of memory devices coupled to this memory controller. Moreover, an additional reduction in I/O pin count may be achieved if control signals are time division multiplexed onto these 16 signal paths as well.

Furthermore, through the use of time division multiplexing, bandwidth may be efficiently allocated to each type of memory device as needed. For example, flash memory may primarily be used when a system is booting up, while DRAM may primarily be used when the system is in a standard operating mode. Accordingly, a memory controller constructed in accordance with the teachings herein may be constructed at a lower cost and with a smaller footprint, and may enable memory in the system to be used more efficiently.

Figure 2:
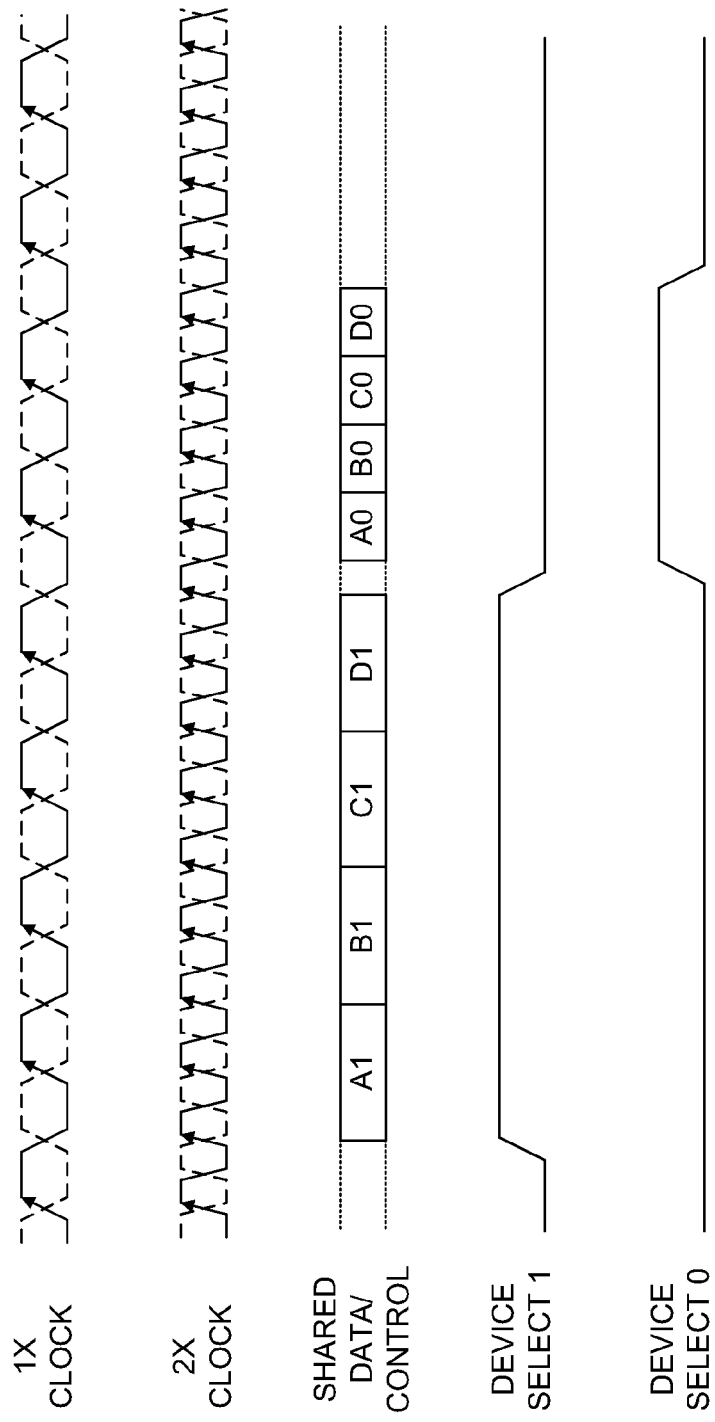
FIG. 2 is a simplified diagram of sample timing in a memory system where different types of memory are accessed at different rates via a time division multiplexed signal bus.

The timing diagram of FIG. 2 illustrates an example of multi-rate time division multiplexing on a shared bus. In this example, a memory controller (not shown) generates a clock signal and a device select signal for each of two different types of memory devices (not shown). Specifically, a faster clock (2×) provided to a first memory device (enabled by device select 0) operates at twice the rate of a slower clock (1×) provided to a second memory device (enabled by device select 1).

As discussed above, the shared bus may carry multiplexed control information and data. For example, when accessing a given memory device, the memory controller may first send the appropriate control information (e.g., command and address) to the memory device, after which the data for that access may be output onto the shared bus. Thus, in the example of FIG. 2, the blocks A0, B0, etc., and A1, B1, etc., may correspond to control information and/or data.

When reading or writing to the second memory device, device select 1 is activated, whereupon control information and data are output on the shared bus at a rate corresponding to the slower clock. Specifically, a first set of command information and/or data represented by block A1 is output during a rising edge of the slower clock, a second set of command information and/or data represented by block B1 is output during the next rising edge of the slower clock, and so on.

When reading or writing to the first memory device, device select 0 is activated, whereupon control information and data are output on the shared bus at a rate corresponding to the faster clock. Specifically, a first set of command information and/or data represented by block A0 is output during a rising edge of the faster clock, a second set of command information and/or data represented by block B0 is output during the next rising edge of the faster clock, and so on.

A memory controller may include appropriate functionality to maintain reliable operation when switching between different rates. For example, if the two clock signals are not transmitted in phase from the memory controller, a timing shift may be employed when switching between signaling to the different types of memory devices.

While FIG. 2 illustrates an example where a data may be sampled on a rising edge of the clock, the teachings herein are applicable to other clocking schemes as well. For example, a double-date rate scheme (i.e., sampling on both negative and positive clock edges), a quad-date rate scheme, or some other suitable clocking scheme may be employed in other implementations that employ clock and data rates that are compatible with such a scheme.

Multi-rate time division multiplexing may be implemented in various ways. Sample implementation details will now be described in conjunction with the flowcharts of FIGS. 3 and 4. For convenience, the operations of FIGS. 3 and 4 (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

Figure 3:
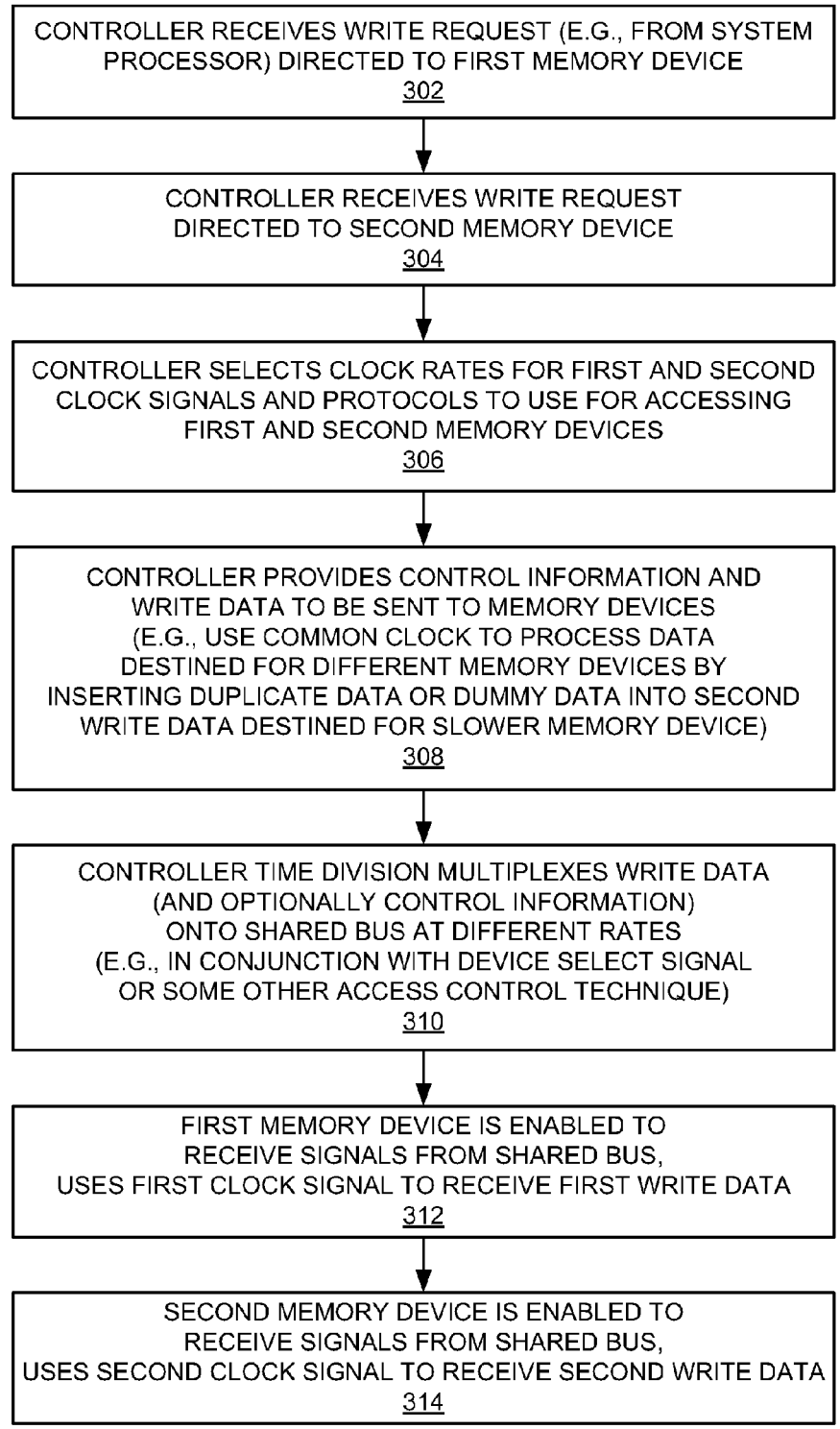
FIG. 3 is a flowchart of an embodiment of sample memory write operations.

Referring initially to FIG. 3, this flowchart describes sample operations that may be performed in conjunction with writing data to different types of memory devices over a shared bus. As represented by blocks 302 and 304, at some point in time a memory controller receives requests (e.g., from a system processor) to write data to first and second types of memory devices (e.g., memory devices 106 and 108). For example, the memory controller may receive a first write request including data to be written to an address corresponding to a first memory device (block 302) and a second write request including data to be written to an address corresponding to a second memory device (block 304).

As represented by block 306, the memory controller may select the appropriate clock rates and protocols to be used for the write operations. For example, if the destination address of the write request corresponds to the first memory device, the memory controller selects the clock rate corresponding to that memory device (e.g., a native rate of the memory device) and the protocol to be used for accessing that memory device. A similar operation is performed if the destination address of the write request corresponds to the second memory device.

The manner in which the memory controller outputs clock signals to the memory devices depends on the configuration of the clock bus from the memory controller to the memory devices. In some implementations the clock bus comprises separate clock signal paths that are routed to each type of memory device (e.g., as shown in FIG. 1). In this case, the memory controller may continually output clock signals having different rates (e.g., 1× and 2×) on the different clock bus signal paths.

As discussed in more detail below at FIG. 22, other implementations may use a multiplexed clock bus wherein a shared clock signal path is routed to the different types of memory devices. In this case, the memory controller may output a clock signal having a given clock rate on the clock bus for a period of time (e.g., when a first type of memory device is enabled on a shared data bus), and then output another clock signal having another clock rate on the clock bus for another period of time (e.g., when a second type of memory device is enabled on the shared data bus).

The protocol used by a given type of memory device specifies the control information (e.g., instruction sets) used to access the memory device. In some cases such an instruction protocol specifies which instructions (e.g., commands) are used for a given type of memory. For example, a DRAM protocol may include a refresh instruction that is not used in a flash protocol, while a flash protocol may include a polling instruction that is not used in a DRAM protocol. In some cases the instruction protocol specifies the code values associated with a particular instruction. For example, as discussed in more detail below at FIGS. 9A and 9B, in one protocol a write instruction may have a code value of 0x02 while in another protocol a read instruction may have a code value of 0x02. In some cases the protocol defines timing parameters associated with accessing a given type of memory device. For example, a protocol may define the minimum or maximum times at which data is available to be read from a memory device after the memory device receives a read (or poll) instruction. Also, a protocol may define one or more phase shifts to be applied to a clock when accessing a particular memory device. In some cases the instruction protocol defines packets sizes to be used when accessing a given type of memory. For example, as discussed in more detail below at FIGS. 8A and 8B, one protocol may specify that each packet is 6 bits wide (e.g., for a 6 wire control bus) and 4 bits long (e.g., a packet is clocked out in 4 clock cycles), while another protocol may specify that each packet is 3 bits long.

In some cases the instruction protocol defines the specific signal lines upon which control information (e.g., commands and address) are provided to the memory device. As discussed in more detail below, in some cases one or more signal paths of the shared bus may be re-tasked (e.g., from data to control) when accessing different types of memory.

As represented by block 308, the memory controller provides the control information and write data to be sent to the memory devices. For example, the memory controller may format appropriate command and address (C/A) information and data (DQ) into packets for delivery to the respective memory devices. As described in more detail below in conjunction with FIGS. 23-26, the memory controller may advantageously process the information to be sent to the memory devices at a common clock rate. For example, the controller may provide the formatted C/A information and data to be sent at different rates over the shared bus at the fastest one of these rates. In this case, the slower rate information may be subsequently processed to output the data at the proper rate on the shared bus. For example, duplicate data may be added to the slower data stream or timing bubbles may be added to this data stream as discussed below. Similar operations may be performed for control information sent at a slower rate.

As represented by block 310, the memory controller time division multiplexes the write data destined for the different memory devices on the shared bus. As discussed herein (e.g., at FIG. 2), the memory controller thus sends the write data destined for one type of memory device at one clock rate and the write data destined for another type of memory device at another clock rate.

The memory controller may output the control information destined for the memory devices in different ways in different implementations. In some cases, the control information may be time division multiplexed onto a shared bus with the data as discussed above. That is, the memory controller may employ a time division multiplexed control and data bus. For example, in FIG. 2 the block A1 may comprise C/A information and the blocks B1-D1 may comprise data destined for one of the memory devices.

In some cases, a memory system may employ separate data and control buses. In these cases, the control bus may be shared between the memory devices or a dedicated control bus may be provided for each memory device. For example, a shared control bus may be employed whereby the memory controller time division multiplexes the control information destined for the different memory devices onto the shared control bus. Alternatively, a dedicated control bus may be provided for each type of memory. For example, a memory controller may send control information to one type of memory device over one control bus and send control information to another type of memory device over a different control bus.

The rate at which a memory controller outputs control information to the memory devices depends on the configuration of the bus or busses used to convey this information. In some cases the memory controller outputs the control information at different rates for different types of memory devices. For example, on a multiplexed bus, the memory controller may send control information to one type of memory device at one rate (e.g., block A1 in FIG. 2) and send control information to another type of memory device at a different rate (e.g., block A0 in FIG. 2). Similarly, when dedicated control busses are employed, the memory controller may send the control signals at different rates over the different control busses.

In other cases a memory controller may send control information to different types of memory devices at the same rate even though data is sent to these memory devices at different rates. For example, when control information is sent over a shared bus (control only or data/control), the memory controller may continuously or periodically send the control information at the clock rate associated with the slowest memory device (e.g., the slowest clock rate used for transferring data) or at some slower rate. In this way, all of the memory devices on the shared bus will be able to acquire the control information at least at some points in time. Such a scheme may be particularly practical in a memory system where the faster memory devices operate (e.g., receive control information) at a rate that is an integer multiple of the rate at which the slowest memory device operates. Clocks signals for such integer multiple rates may be generated in various ways. In some implementations, a lower rate clock may be generated by dividing down a higher rate clock. In some implementations, a lower rate clock and a higher rate clock may be generated from a common clock (e.g., different dividers may be used to generate the higher rate clock and the lower rate clock from a common timing source).

In some aspects, the time division multiplexing on the shared bus is achieved by controlling which memory device is enabled on the shared bus. In some cases this is achieved through the use of device select (e.g., chip select) signals that enable the memory devices on a mutually exclusive basis as described at FIG. 2.

In some cases memory device access control is achieved through the use of control information that specifies which memory device is enabled for a given data transfer on the shared bus. For example, all of the memory devices on a bus may be configured to receive control information that indicates which memory device is to be enabled for a data transfer on the shared bus for a given period of time. Here, the memory devices may be configured to receive the control information continuously or at specified times (e.g., on a periodic basis). Based on this information, each memory device may enable itself onto the shared bus at the specified times for data transfers.

As represented by blocks 312 and 314, the memory devices are thus enabled at the appropriate times to receive their respective write data from the memory controller. Here, when a first memory device is enabled, the memory device may enable its receiver circuitry so that it receives clock signals (e.g., in the case of a shared clock bus), control information, and data during this time period. In contrast, any other memory device on the shared bus may ignore the signals on the shared bus during this time period. For example, another memory device may disable its receiver circuitry so that it does not receive clock signals, control information, or data at this time. Sample circuits that may be employed in a memory device for enabling and disabling the receiver circuitry are described below at FIGS. 20-22.

When enabled, each memory device uses a corresponding clock signal (e.g., provided by the memory controller, that memory device, or some other entity) to receive write data from the shared bus. For example, as shown in FIG. 2, a given memory device (device 1) may use a clock signal having a first clock rate (1×) to receive its write data (A1-D1) while another memory device (device 0) may use another clock signal having a second clock rate (2×) to receive its write data (A0-D0).

Figure 4:
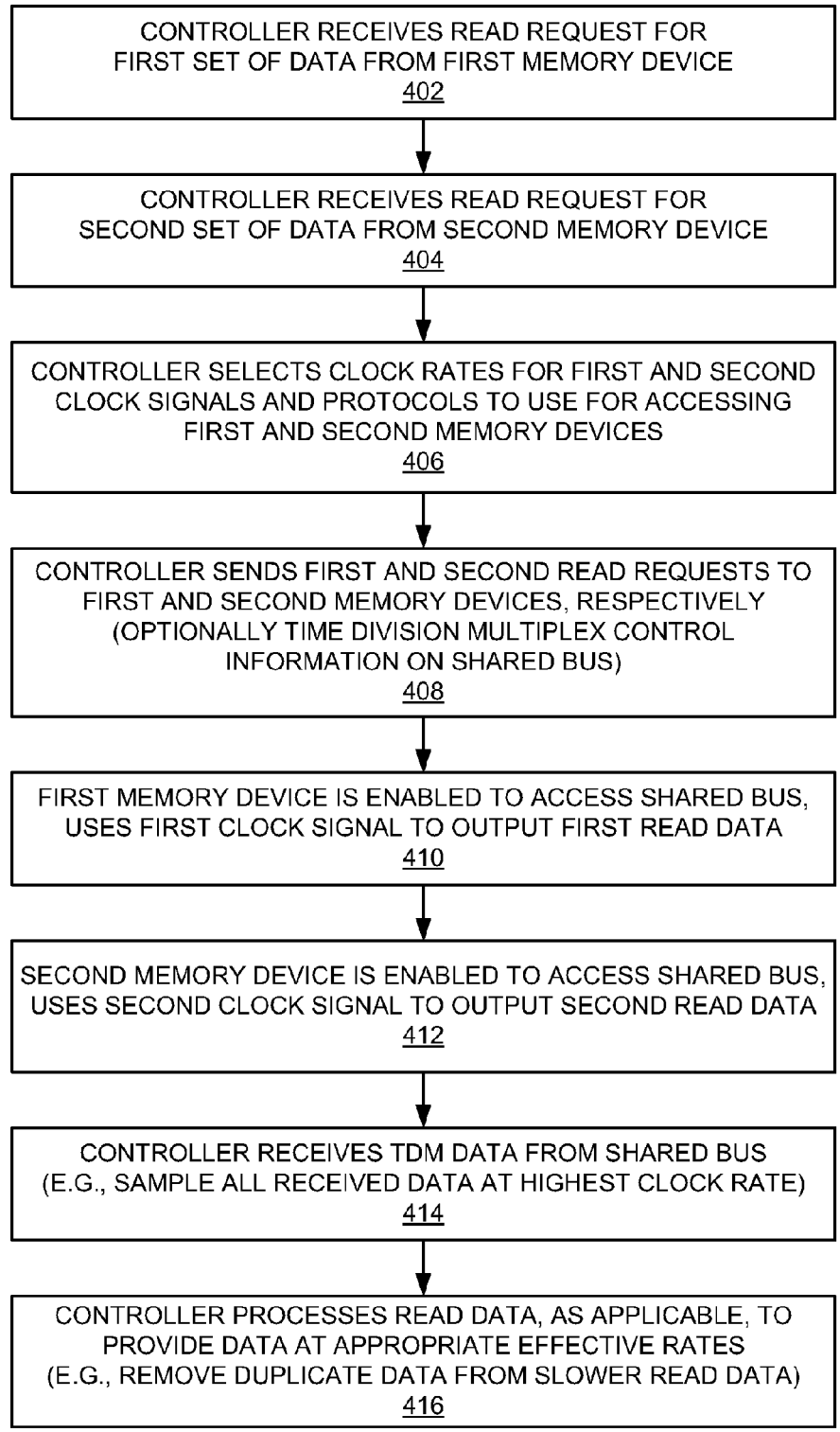
FIG. 4 is a flowchart of an embodiment of sample memory read operations.

Referring to FIG. 4, this flowchart describes sample operations that may be performed in conjunction with reading data from different types of memory devices over a shared bus. As represented by blocks 402 and 404, at some point in time a memory controller receives a request (e.g., from a system processor) to read data from an address corresponding to a first type of memory device and also receives a request to read data from an address corresponding to a second type of memory device.

As represented by block 406, the memory controller may select the appropriate clock rates and protocols to be used for the read operations. These operations may thus be similar to the operations described above at block 306.

As represented by block 408, the memory controller provides control information for reads requests to be sent to the memory devices. For example, the memory controller may format appropriate command and address (C/A) information into packets for delivery to the respective memory devices. The memory controller sends the control information to the memory devices via the appropriate bus (e.g., via a shared data/control bus, via a shared control bus, or via dedicated control busses). Accordingly, these operations may be similar to comparable operations described above at blocks 308 and 310. For example, the control information may be sent at the same or different rates to different memory devices, the control information may be time division multiplexed on a shared bus, device select signals or other access control techniques may be used to enable the memory devices for data transfer on a shared bus, and so on.

As represented by blocks 410 and 412, the memory devices are enabled at the appropriate times to output their respective read data onto the shared bus upon receipt of a read request. Thus, each memory device uses a corresponding clock signal provided by the memory controller to output the read data so that the data is time division multiplexed at different rates on the shared bus. These operations may thus be similar in some aspects (e.g., with respect to the access control, receipt of control information, and use of clock signals) to the write operations described above at blocks 312 and 314.

As represented by block 414, the memory controller receives the time division multiplexed data from the shared bus. As discussed below at FIGS. 24 and 26, in some implementations the memory controller may advantageously sample the received time multiplexed data at a single rate even though the read data from the different memory devices appears on the shared bus at different rates. For example, the received data may be sampled at the clock rate associated with the fastest memory device (e.g., fastest clock rate used for transferring data) or at some faster rate.

As represented by block 416, the memory controller processes the received read data, if applicable, to provide the read data at the appropriate effective rate. For example, if a higher rate clock is used to sample lower rate data, duplicate or timing bubbles may be removed from the received data stream. Conversely, when the sampling clock rate is the same as the data rate, the memory controller may not need to process the data further. Once the read data is acquired from a given one of the memory devices, the memory controller sends the data to the requestor (e.g., a system processor) to complete the read operation.

Figure 5:
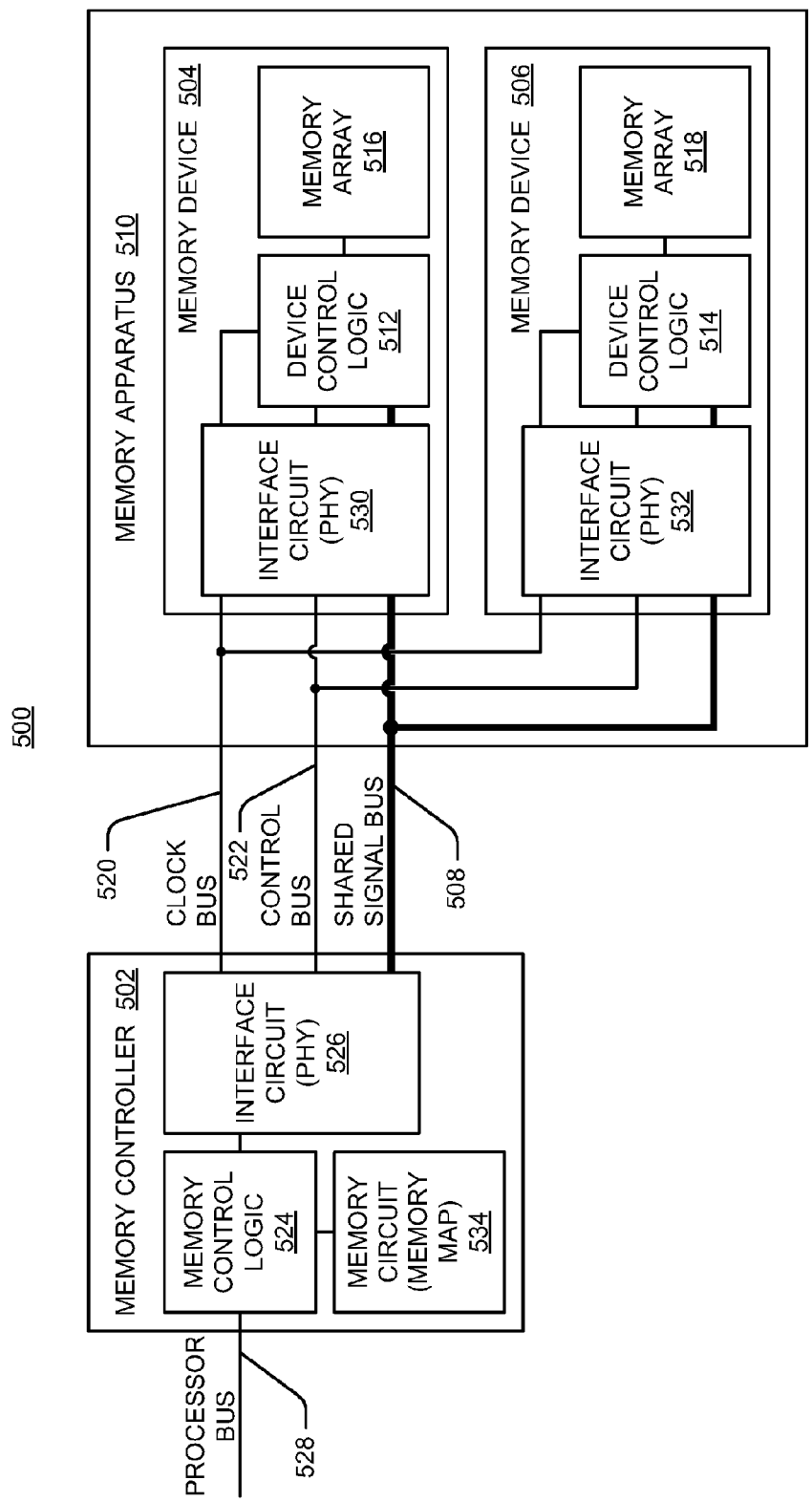
FIG. 5 is a simplified block diagram illustrating sample functional components of an embodiment of a memory system.

Referring now to FIG. 5, sample high-level functional components that may be employed in a memory controller and a memory device are described. Here, a memory system 500 includes a memory controller 502 that accesses different types of memory devices 504 and 506 via a shared signal bus 508. The components of FIG. 5 may thus correspond to similar components described in FIG. 1. In some aspects, the memory controller 502 and the memory devices 504 and 506 provide functionality similar to conventional memory controllers and memory devices. In addition, the memory controller 502 and the memory devices 504 and 506 include functionality that facilitates the memory control operations taught herein. FIG. 5 illustrates, in a simplified manner, sample functional components that may provide this additional functionality.

The memory controller 502 includes memory control logic 524 and an interface circuit 526 (e.g., a physical interface circuit, commonly known as a PHY). The memory control logic 524 performs functions such as, for example, queuing and interpreting instructions (e.g., commands, requests, and so on) received from a processing entity (e.g., a CPU) via a processor bus 528 (e.g., CPU bus), forwarding write data received via the system bus 528 to the memory devices 504 and 506, forwarding read data read from the memory devices 504 and 506 over the system bus 528, performing instruction arbitration, enforcing timing constraints for read and write operations, and ensuring that data is written to and read from the memory devices 504 or 506 at the correct rate and using the appropriate protocol as taught herein. In addition, the memory control logic 524 may use information (e.g., a memory map) stored in a memory circuit 534 to determine operating parameters (e.g., clock rates, protocols, and so on) to be used when accessing different types of memory devices. The interface circuit 526 may perform operations such as, for example, driving channels, receiving bits, serializing data, deserializing data, and providing clock domain crossing functionality. These and other memory controller operations are described in more detail below at FIGS. 6-11.

The memory devices 504 and 506 respectively include an interface circuit 530 or 532, device control logic 512 or 514, and a memory array 516 or 518. For convenience, the following describes sample operations of the components of the memory device 504. It should be appreciated that similar operations may be performed by the components of the memory device 506. The interface circuit 530 interfaces with the system busses (e.g., the shared signal bus 508, a clock bus 520, and a control bus 522) to facilitate writing data to and reading data from the memory array 516. In some aspects, the interface circuit 530 is configured to receive control information and/or data from one or more of the system busses at a rate that is based on a clock provided on the clock bus 520. In addition, the interface circuit 530 is configured to output data read from the memory array 516 onto the shared signal bus 508 at a rate that is based on a clock provided on the clock bus 520. The control logic 512 uses a protocol associated with the memory device 504 to control reads from and writes to the memory array 516. Specifically, the control logic 512 forwards write data received by the interface circuit 530 to the memory array 516 and forwards read data from the memory array 516 to the interface circuit 528 for transmission via the shared signal bus 508. These and other memory device operations are described in more detail below at FIGS. 11-22.

In the example of FIG. 5, the memory devices 504 and 506 are implemented in a memory apparatus 510. In some implementations the memory apparatus 510 comprises a single integrated circuit package within which the memory devices 504 and 506 are co-packaged. For example, the dies of the memory devices 504 and 506 may be provided on a common substrate within the package, stacked on top one another, or co-located in some other manner. The memory apparatus 510 may take other forms such as, for example, a printed circuit board upon which the memory devices 504 and 506 are placed. Also, the memory apparatus 510 may comprise any suitable number of different types of memory devices and/or any suitable number of memory devices.

Through the use of such a memory apparatus, the memory system 500 may incorporate fewer signal paths (e.g., on a circuit board upon which the memory controller 502 and the memory apparatus 510 are placed) as compared to conventional systems that use separate interfaces for different types of memory devices. Consequently, the complexity and, hence, the cost of the memory system 500 may be lower in comparison to these conventional systems.

The memory apparatus 510 includes suitable signals paths for routing the system busses to the memory devices 504 and 506. In particular, the shared signal bus 508 is routed to the memory devices 504 and 506 in parallel. For example, the shared signal 508 bus may be routed to the memory devices 504 and 506 using a multi-drop coupling scheme. In addition, the control bus 522 and/or the clock bus 520 may be routed to the memory devices 504 and 506 in a parallel configuration or different portions of these busses may be routed to one or the other memory device.

In some cases, the clock bus 520 may comprise a single signal path or multiple signal paths (e.g., for differential signals or a branched clock) upon which different clock signals having different clock rates are multiplexed. Alternatively, in some cases the clock bus 520 may comprise a set of dedicated clock signal paths, where a given signal path (or pair of paths) is routed to a given one of the memory devices.

Control signals also may be routed between a memory controller and its associated memory devices in different ways in different implementations. Hence, the control bus 522 of FIG. 5 may take different forms in different implementations.

In some implementations control signals are multiplexed onto the shared signal bus 508 with the data. In this case the control bus 522 may comprise a single signal path or multiple signal paths that carry access control signals (e.g., device select signals as shown in FIG. 1) or some other type of signal.

In some implementations control signals are provided on a different bus or busses than the data. In this case the control bus 522 may comprise a shared control bus or several dedicated control buses (i.e., different sets of control signal paths).

In an implementation that uses a shared control bus, the control bus 522 may comprise a multiplexed bus that is routed in parallel to the memory devices 504 and 506. Again, the control signals destined for different types of memory devices may be provided at the same rate or different rates in this case.

In an implementation where the control bus 522 comprises several dedicated busses (e.g., a dedicated set of control signal paths for each different type of memory device), a given dedicated bus may be routed to a given one of the memory devices. For example, one set of signal paths may comprise a C/A bus that carries C/A signals to one type of memory device, while a different set of signal paths may comprise another C/A bus that carries another set of C/A signals to another type of memory device. In such a case, the control signals on the different sets of control signal paths will typically be provided at different rates (e.g., based on the native rates of the memory devices).

Figure 6:
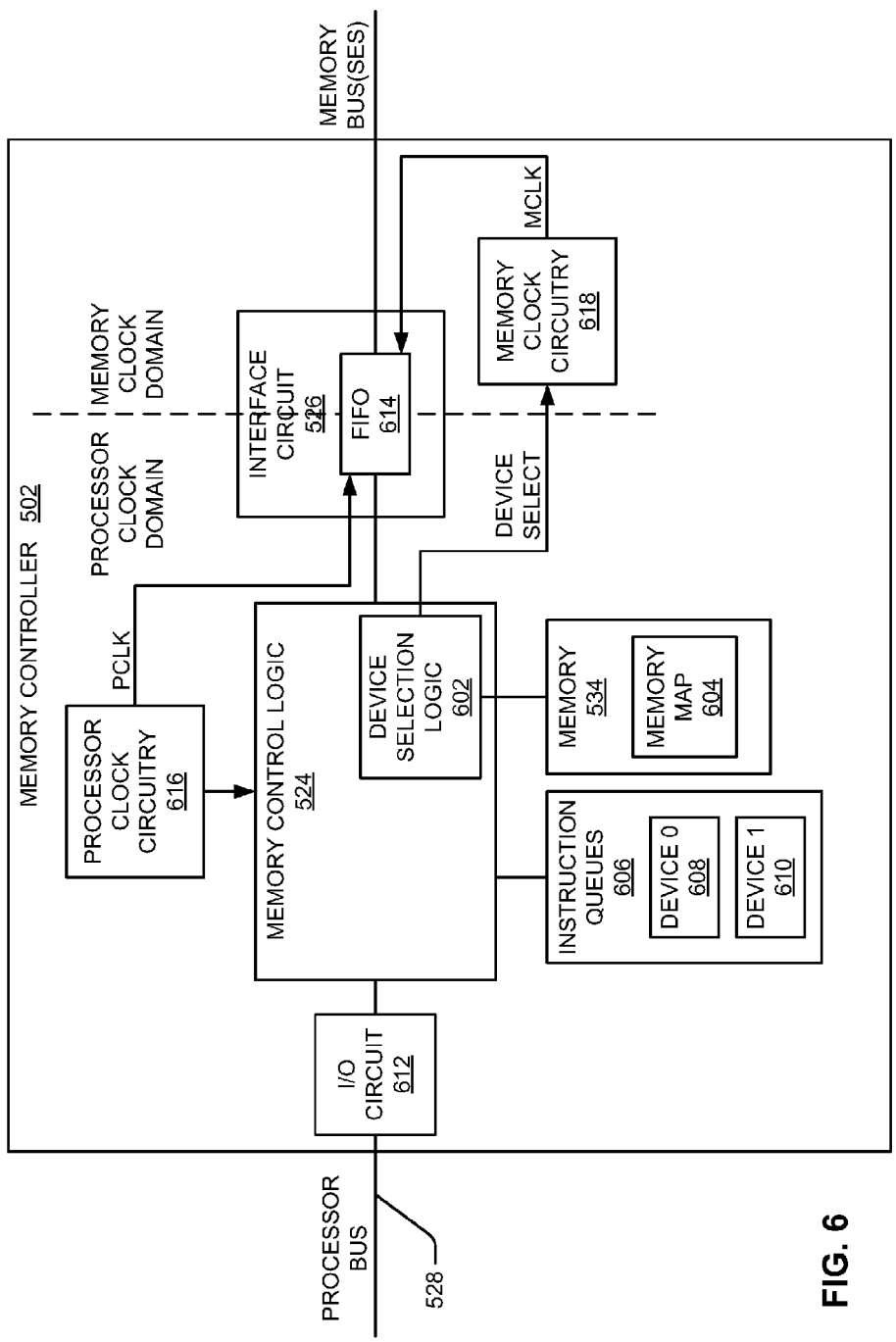
FIG. 6 is a simplified block diagram illustrating sample functional components of an embodiment of a memory controller.

FIG. 6 illustrates sample components that may be employed in the memory controller 502 to facilitate reading from and writing to different types of memory devices at different rates as taught herein. The memory control logic 524 includes device selection logic 602 that may select different parameters or information to be used when accessing different types of memory by accessing this information from a memory map 604 of the memory device 534. For example, the device selection logic 602 may select (e.g., identify) the particular type of memory to be accessed (e.g., a target memory device) by using the target address received with a read or write instruction as a lookup entry into the memory map. In addition, the device selection logic 602 may select the clock rate and/or protocol to be used when accessing a given type of memory device. A sample memory map is described in more detail below at FIG. 7.

As mentioned above, the memory control logic 524 provides functionality to process instructions received via the processor bus 528 from a system component that writes data to and/or reads data from any of the different types of memory controlled by the memory controller 502. Here, the memory control logic 524 may utilize instruction queues 606 for queuing incoming instructions (e.g., in the event an access of a memory device is pending when a new instruction is received). As represented by the instruction queues 608 and 610 for device 0 and device 1, respectively, an instruction queue may be provided for each memory device controlled by the memory controller 502.

The memory control logic 524 interfaces with the processor bus 528 via an input/output (I/O) circuit 612. The I/O circuit 612 may take different forms in different implementations. In implementations where the memory controller 502 resides on the same integrated circuit (e.g., the same die) as the system entity (e.g., CPU) that uses the memory controller 502 to access system memory, the I/O circuit 612 may simply comprise, for example, signals paths to other logic within the same die. In implementations where the memory controller 502 resides on a different integrated circuit (e.g., a different die) than the system entity that uses the memory controller 502, the I/O circuit 612 also may comprise, for example, transmitter and receiver components for driving and receiving signals.

The memory control logic 524 sends commands to the memory devices and transfers data to and from the memory devices via the interface circuit 526. In some aspects, the interface circuit 526 comprises a clock domain crossing circuit (e.g., implemented as a FIFO 614) that translates between a processor clock domain and a memory clock domain. For example, the memory control logic 524 may perform operations (e.g., clock in and clock out information) based on a processor clock (e.g., PCLK) provided by processor clock circuitry 616. However, information transfers between the memory controller 502 and the memory devices via the memory bus or busses (e.g., bus 508 and, in some cases, bus 522 of FIG. 5) will occur at different clock rates based on a memory clock (e.g., MCLK) provided by memory clock circuitry 618.

Figure 7:
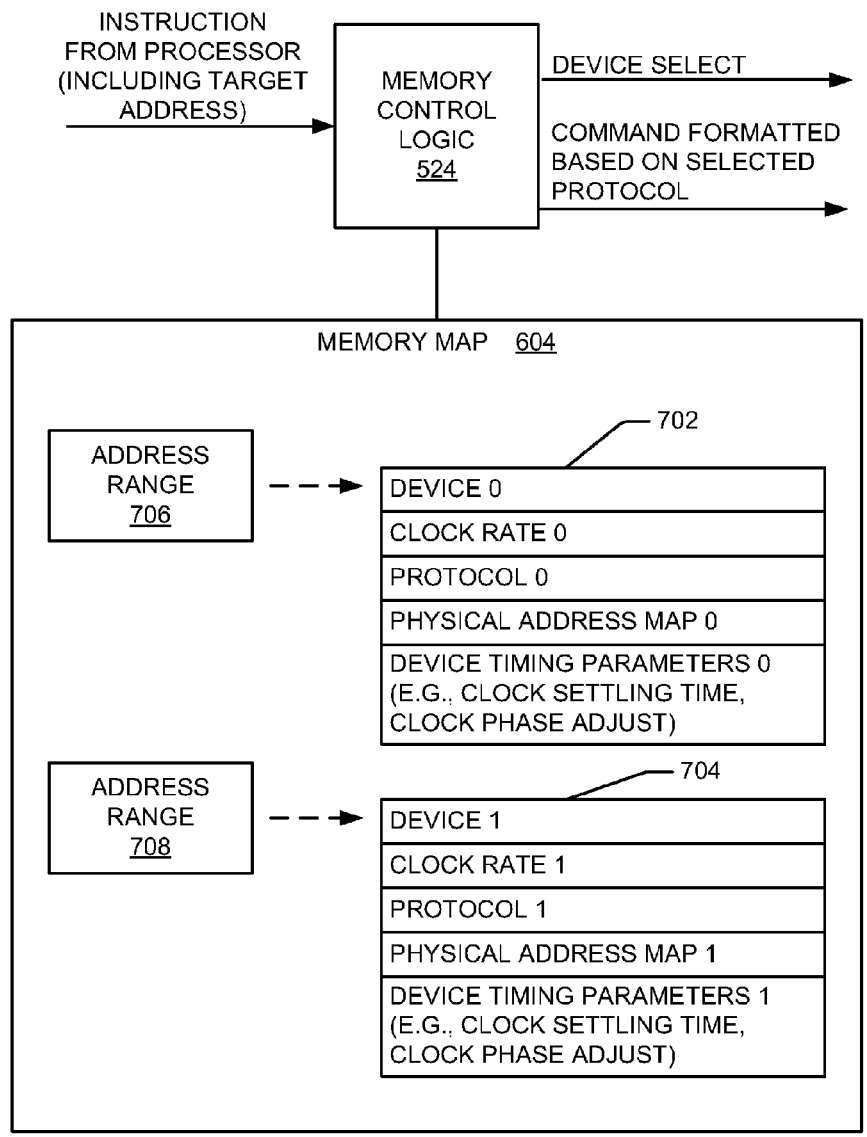
FIG. 7 is a simplified block diagram illustrating sample aspects of an embodiment of a memory map.

The current clock rate provided by the clock circuitry 618 is based on a device select signal provided by the device selection logic 602. Referring now to FIG. 7, an example of how the memory control logic 524 (e.g., the device selection logic 602) may select the appropriate parameters for accessing a given type of memory device will be described.

The memory map 604 includes different entries for different types of memory devices. For example, a first set of entries 702 may correspond to a first type of memory device (designated device 0) and a second set of entries 704 may correspond to a second type of memory device (designated device 1). Here, the memory map 604 may map a set (e.g., a range) of target addresses to each set of entries. For example, an address range 706 (e.g., a range of virtual addresses) that corresponds to the physical addresses assigned to the first type of memory device are mapped to the first set of entries 702. Similarly, a different address range 708 (e.g., a range of virtual addresses) that corresponds to the physical addresses assigned to the second type of memory device are mapped to the second set of entries 704. Thus, when the memory control logic 524 receives an instruction (e.g., a read or write request) that includes a particular target address, the memory control logic 524 identifies which address range that target address falls within and then, based on the mapping of the memory map 604, determines which set of entries is to be used for that memory access.

The entries for a given type of memory device may take various forms. For example, as shown in FIG. 7, an entry may identify: 1) the device or devices associated with that type of memory device; 2) the clock rate to be used when accessing that type of memory device; 3) the protocol to be used when accessing that type of memory device; 4) a physical address map that maps all of the virtual addresses corresponding to that type of memory device to all of the corresponding physical addresses; and 5) device timing parameters such as, for example, the amount of settling time to be employed when switching between clocks and a phase adjustment to be employed for a clock when accessing that type of memory device. In view of the above, it may be appreciated that in some aspects the memory map 604 provides a mapping between a particular type of memory device and various device parameters such as clock rate, protocol, etc.

As will be discussed in more detail at FIG. 12, in some implementations the memory control logic 524 uses the clock rate information to configure clock circuitry to provide a desired clock signal when accessing a particular type of memory device. In some implementations, however, the memory control logic 524 may simply assert a device select signal based on the identification of a particular memory device from the memory map. For example, upon determining that a received instruction is targeted to memory device 0, the memory control logic (e.g., the device selection logic 602) may simply assert the device select signal for that memory device. The clock circuitry 618 may then be configured to provide a clock signal with the appropriate clock rate based on the assertion of the device select signal.

As mentioned above, the different types of memory devices may be configured to use different protocols. Thus, the memory control logic 524 may format a command (e.g., read, write, etc.) destined for a particular memory device based on the particular protocol information obtained from the memory map 604. FIGS. 8A and 8B illustrate two examples of protocol formats (e.g., packet structures) that may be employed by different types of memory devices. FIG. 8A may correspond, for example, to a read/write command for a DRAM. In this case, the protocol specifies that certain information such as opcodes (OP), column addresses (C), and bank addresses (BA) appear at certain locations in a packet. FIG. 8B may correspond, for example, to a command for a flash memory. In this case, the protocol specifies that certain information such as opcodes (OP) and addresses (A) appear at certain locations in a packet. Thus, FIGS. 8A and 8B illustrate that different protocols may specify different packet sizes (e.g., 4 bit long and 3 bit long packets) structures. In FIGS. 8A and 8B, the heights of the packets represent bits in time (e.g., times T(N), T(N+1), T(N+2), and T(N+3)) while the widths of the packets represent the bit widths of the packets (e.g., bits 0-5) each of which may correspond to separate wires (e.g., transmission paths 0-5 and/or I/O paths 0-5) of a control bus.

In addition, FIGS. 9A and 9B illustrate that different protocols may use different control signaling. For example, the opcodes for FIG. 9A (e.g., the opcodes for FIG. 8A) may be sent over three wires (bits 0-2) while the opcodes for FIG. 9B (e.g., the opcodes for FIG. 8B) may be sent over two wires (bits 0-1). FIGS. 9A and 9B also illustrate that different protocols may use the same value to identify different commands. For example, a value of 0×2 corresponds to a read in FIG. 9A and a write in FIG. 9B.

Figure 10:
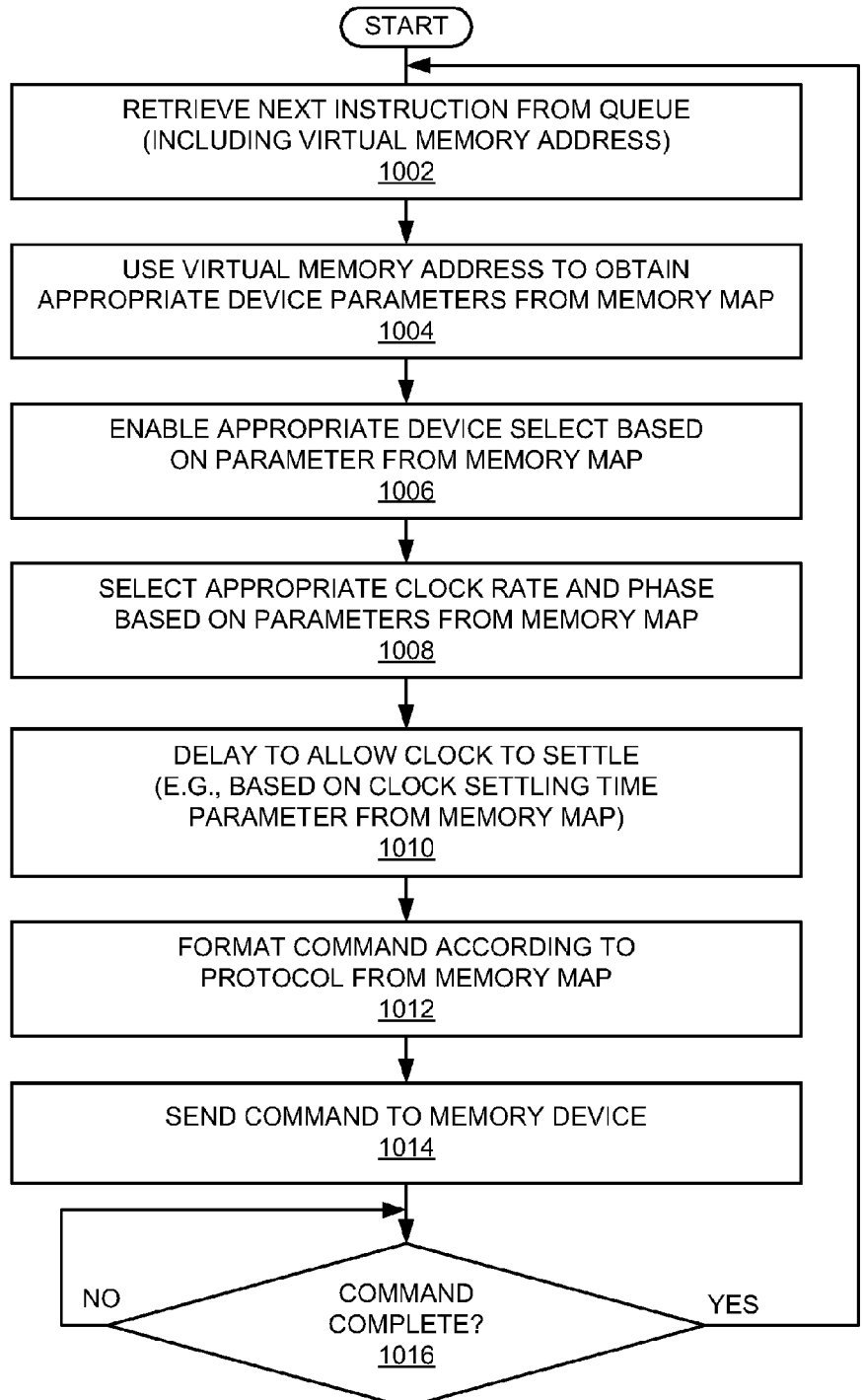
FIG. 10 is a flowchart of an embodiment of sample instruction processing.

With the above in mind, sample operations that may be performed by the memory control logic 524 to process instructions will now be treated with reference to FIG. 10. Here, it is assumed that the memory control logic 524 places incoming instructions into an appropriate instruction queue as discussed above.

As represented by block 1002, the memory control logic retrieves the next instruction from one of the queues. Appropriate arbitration techniques may be employed here in the event multiple instructions are pending concurrently. For example, certain memory accesses (e.g. writes or access to certain memory types or addresses) may be given priority over others, accesses to a given memory device may be queued to enable multiple successive accesses, and so on.

As represented by block 1004, the memory control logic uses the virtual address provided by the instruction to obtain the appropriate memory device parameters from a memory map. As discussed above, the memory control logic may thus identify the target memory device, clock rate, clock phase, settling time, and other information.

As represented by block 1006, the memory control logic may then enable the appropriate memory device or memory devices based on the parameters retrieved from the memory map. For example, an appropriate device select may be enabled at this time and any other previously enabled device selects may be disabled. In addition, as represented by block 1008, in some implementations, the memory control logic may obtain the clock rate and phase information based on the information retrieved from the memory map and use this information to provide an appropriate clock for the requested access.

As represented by block 1010, in the event the clock rate was changed, the memory control logic may delay for a defined period of time to enable the clock to settle. Here, the memory control logic may determine the amount of the delay based on delay (e.g., settling time) information obtained from the memory map for the memory device type.

As represented by block 1012, the memory control logic formats the command to be sent to the memory device based on the protocol information retrieved from the memory map. For example, the memory control logic may determine the appropriate packet structure to use as illustrated in FIGS. 8A-9B.

As represented by block 1014, the memory control logic sends the formatted command to the memory device. As will be described in more detail below at FIG. 11, in some implementations this involves sending the packet to the FIFO 614, for subsequent delivery to the appropriate memory device.

As represented by block 1016, the memory control logic may then wait for this command to complete before retrieving the next instruction from the instruction queue. It should be appreciated, however, that pipelining or other techniques may be employed to improve controller performance here.

Figure 11:
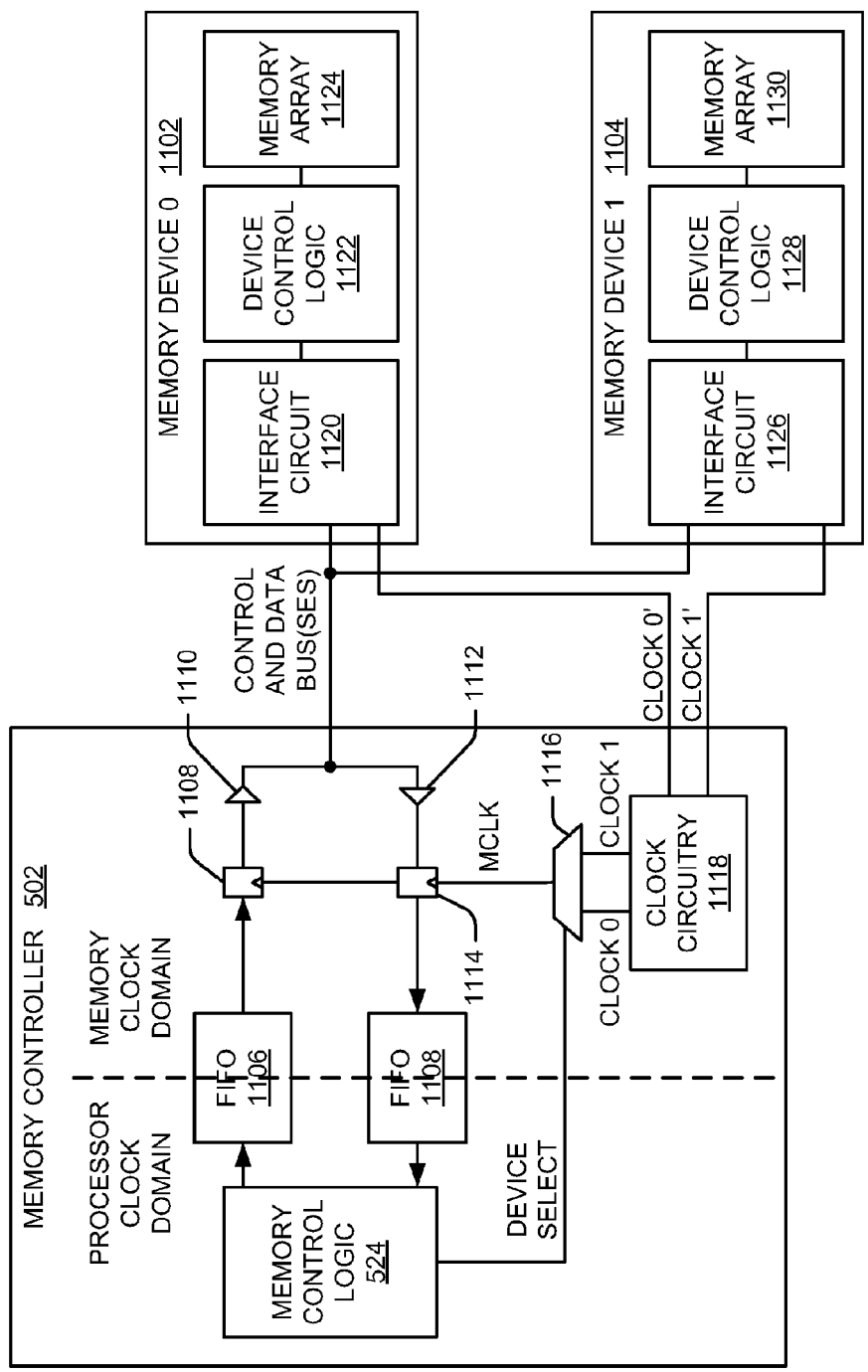
FIG. 11 is a simplified block diagram illustrating sample aspects of rate control in an embodiment of a memory system.

FIG. 11 illustrates sample components that may be employed in an interface circuit and clock circuitry (e.g., one or more clock circuits) of a memory controller. Here, the memory controller 502 is shown connected to a memory device 1102 of a first type and a memory device 1104 of a second type. Accesses of the memory device 1102 are performed based on a clock 0 having one clock rate, while accesses of the memory device 1104 are performed based on a clock 1 having a different clock rate. The clock signals are depicted as clock 0 and clock 0' and as clock 1 and clock 1' to signify that there may be phase differences between the clocks used internally at the memory controller 502 and the clocks present on the signal paths between the memory controller 502 and the memory devices 1102 and 1104. As discussed herein, these clocks may be generated at the memory controller 502, at the memory devices 1102 and 1104, or at some other component.

The FIFO 614 of FIG. 6 is represented as two FIFOs in FIG. 11. A transmit FIFO 1106 is used when sending information to the memory devices 1102 and 1104. A receive FIFO 1108 is used when receiving information from the memory devices 1102 and 1104. In the memory clock domain, information is clocked-out to the memory devices through the use of a set of latches (represented for convenience by a latch 1108) driven by MCLK. Each latched signal is driven by a corresponding transmitter (represented for convenience by a transmitter 1110) and provided to the appropriate memory bus signal path. Conversely, a signal driven by a memory device on a memory bus signal path is received by a receiver (represented for convenience by a receiver 1112) and then clocked-in via a set of latches (represented for convenience by a latch 1114) driven by MCLK.

In this example, the clock rate of MCLK is determined by the current value of the device select signal that is used to control a multiplexer 1116. For example, in a case where there are only two clock signals to select from, the device select signal may take a value of 0 or 1. Here, one value may result in clock 0 provided by clock circuitry 1118 being provided as MCLK and the other value may result in clock 1 provided by the clock circuitry 1118 being provided as MCLK.

The memory device 1102 includes an interface circuit 1120, device control logic 1122, and a memory array 1124. The interface circuit 1120 may include, for example, receivers, transmitters, and latches for sending and receiving signals. The device control logic 1122 may include functionality to, for example, interpret commands from the memory controller 502, activate the memory array 1124, send data to the memory array 1124, and retrieve data from the memory array 1124. The memory device 1104 also includes a similarly named interface circuit 1126, device control logic 1128, and memory array 1130. However, the functionality of these components will be different in some aspects since the memory types are different in this example.

Figure 12:
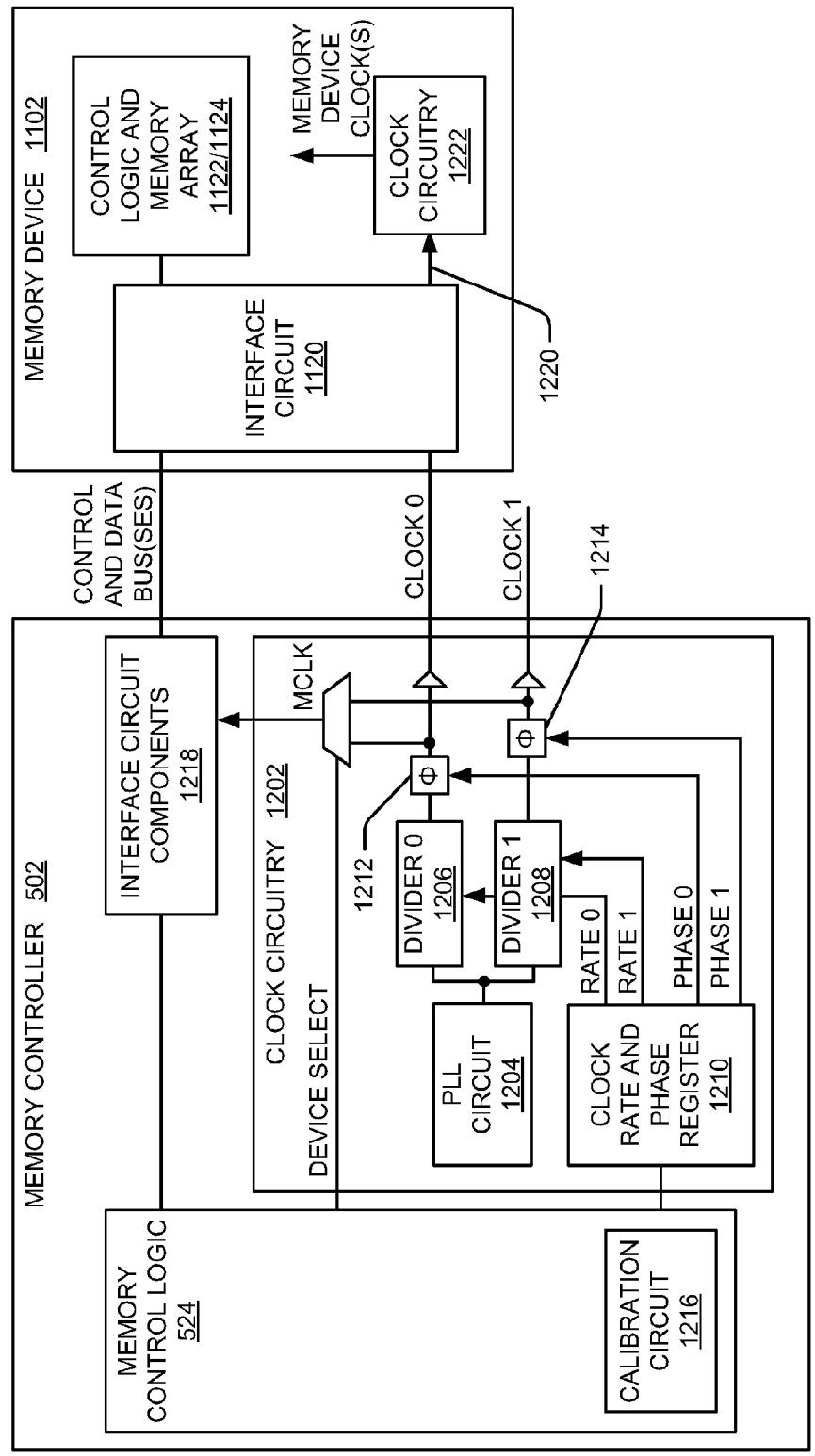
FIG. 12 is a simplified block diagram illustrating sample aspects of an embodiment of clock circuitry for a memory controller.

FIG. 12 illustrates an embodiment of a memory system where clock signals are generated by clock circuitry 1202 of the memory controller 502. In this example, the clock circuitry 1202 includes a phase-locked loop (PLL) circuit 1204 that generates a main clock signal at a specified frequency. Clock signals clock 0 and clock 1 are generated from this main clock signal through the use of dividers 1206 and 1208, respectively. The divisors used by the dividers 1206 and 1208 may be predefined or, more typically, specified by corresponding rate values (rate 0 and rate 1) stored in a register 1210.

In this latter case, the clock rates for clock 0 and clock 1 may thus be specified by the memory control logic 524 by programming the appropriate values into the register 1210. As mentioned above, in some cases these values may be based on information obtained from the memory map. In some cases, these values may be loaded in when the system is initially configured with the memory devices or whenever the memory controller is initialized (e.g., values loaded in from non-volatile memory).

FIG. 12 also illustrates an implementation where phase adjust circuits 1212 and 1214 are used to control the phase of the clock signals clock 0 and clock 1. The phase shifts imparted by the phase adjust circuits 1212 and 1214 may be predefined or, more typically, specified by corresponding phase values (phase 0 and phase 1) stored in the register 1210.

In the latter case, the phase adjustments for clock 0 and clock 1 may thus be specified by the memory control logic 524 by programming the appropriate values into the register 1210. As mentioned above, in some cases these values may be based on information obtained from the memory map. In some cases, these values may be loaded in when the system is initially configured with the memory devices or whenever the memory controller is initialized (e.g., values loaded in from non-volatile memory).

In some cases, the phase values may be determined by a calibration circuit 1216. For example, the calibration circuit may cause known data patterns to be sent to and returned by the memory devices. The calibration circuit may then collect the returned data when different phase values are programmed into the register 1210. Then, based on error rate or other information associated with the returned data for each phase, an optimum phase value may be selected by the calibration circuit 1216.

In the example of FIG. 12, MCLK is selected from clock 0 and clock 1 based on the device select signal. MCLK is then provided to the appropriate interface circuit components 1218 (e.g., latches and FIFOs) as described above.

The clock signals clock 0 and clock 1 also are sent to corresponding memory devices. For convenience, only memory device 1102 is shown in FIG. 12. Here, clock 0 is received by the interface circuit 1120 (which may simply provide a receiver for the clock signal) which routes the signal via a signal path 1220 to clock circuitry 1222 of the memory device 1102. The clock circuitry 1222 may then generate one or more clock signals for use by the components (e.g., latches in the interface circuit 1120) of the memory device 1102 based on clock 0. For example, the clock circuitry 1222 may incorporate circuitry to impart a phase delay on the clock, may incorporate circuitry (e.g., a PLL) to clean-up the clock, or may incorporate other types of circuitry (e.g., to passively pass the clock).

As mentioned above, in some cases more than one clock may be used for a given type of memory device. For example, one clock rate may be used to read from a memory device and another clock rate may be used to write to the memory device.

Figure 13:
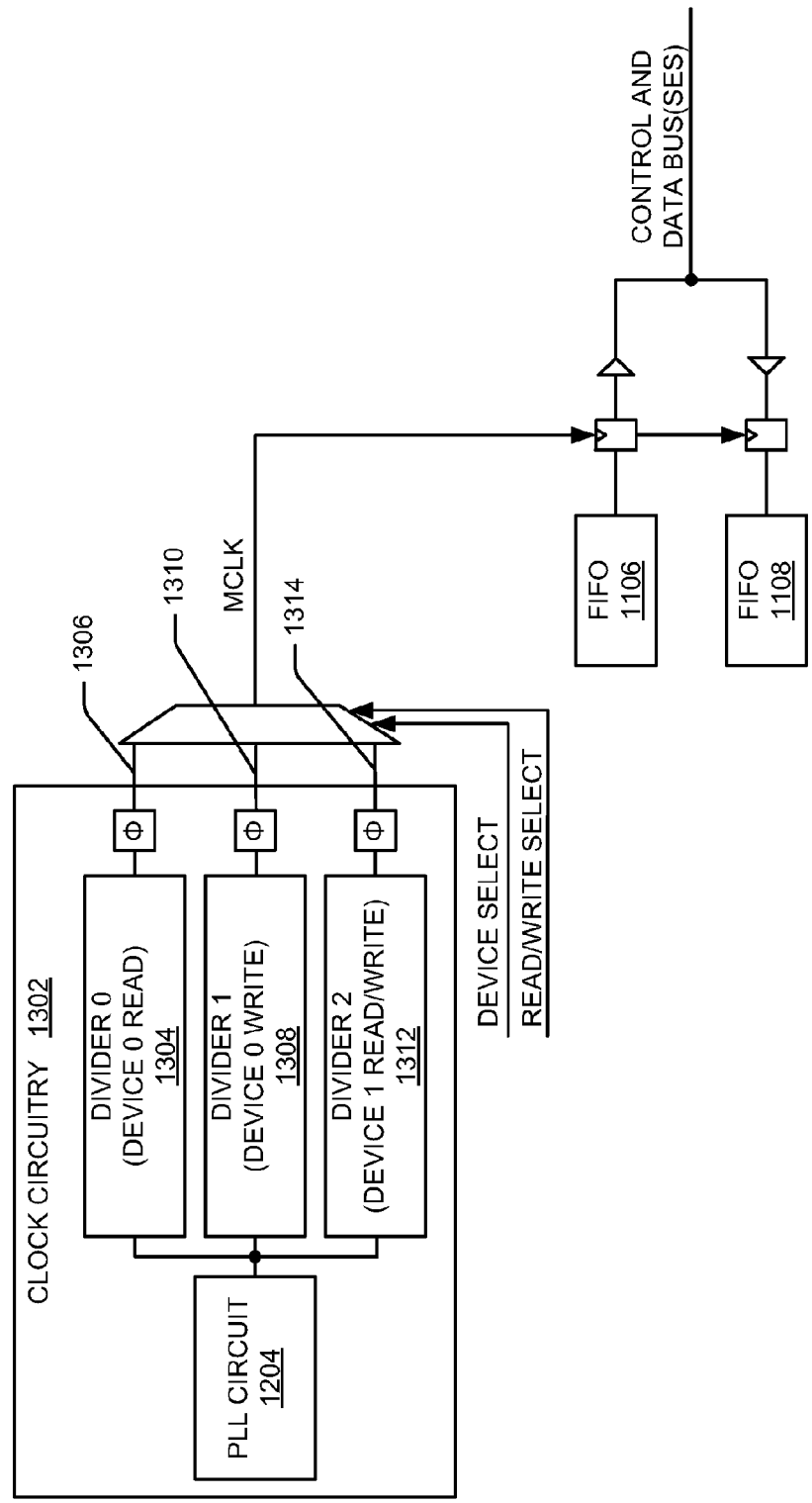
FIG. 13 is a simplified block diagram illustrating sample aspects of an embodiment of clock circuitry that supports a plurality of clock rates for a given type of memory device.

FIG. 13 illustrates an example of clock circuitry 1302 where more than two clock signals are provided for two memory types. Here, a divider 1304 provides a clock 1306 at a first clock rate, a divider 1308 provides a clock 1310 at a second clock rate, and a divider 1312 provides a clock 1314 at a third clock rate. The clock 1306 may be used, for example, when reading from a first memory device (e.g., device 0). The clock 1310 may be used, for example, when writing to the first memory device (e.g., device 0). The clock 1314 may be used, for example, when reading from or writing to a second memory device (e.g., device 1).

Various techniques may be used for selecting these clocks. In the example of FIG. 13, a read/write select signal (e.g., provided by memory control logic) is used in conjunction with the device select signal. In other cases, however, other types of signals may be employed. For example, signals that provide a particular code for a particular access (e.g. a read or write) of a particular type of access point may be used.

Figure 14:
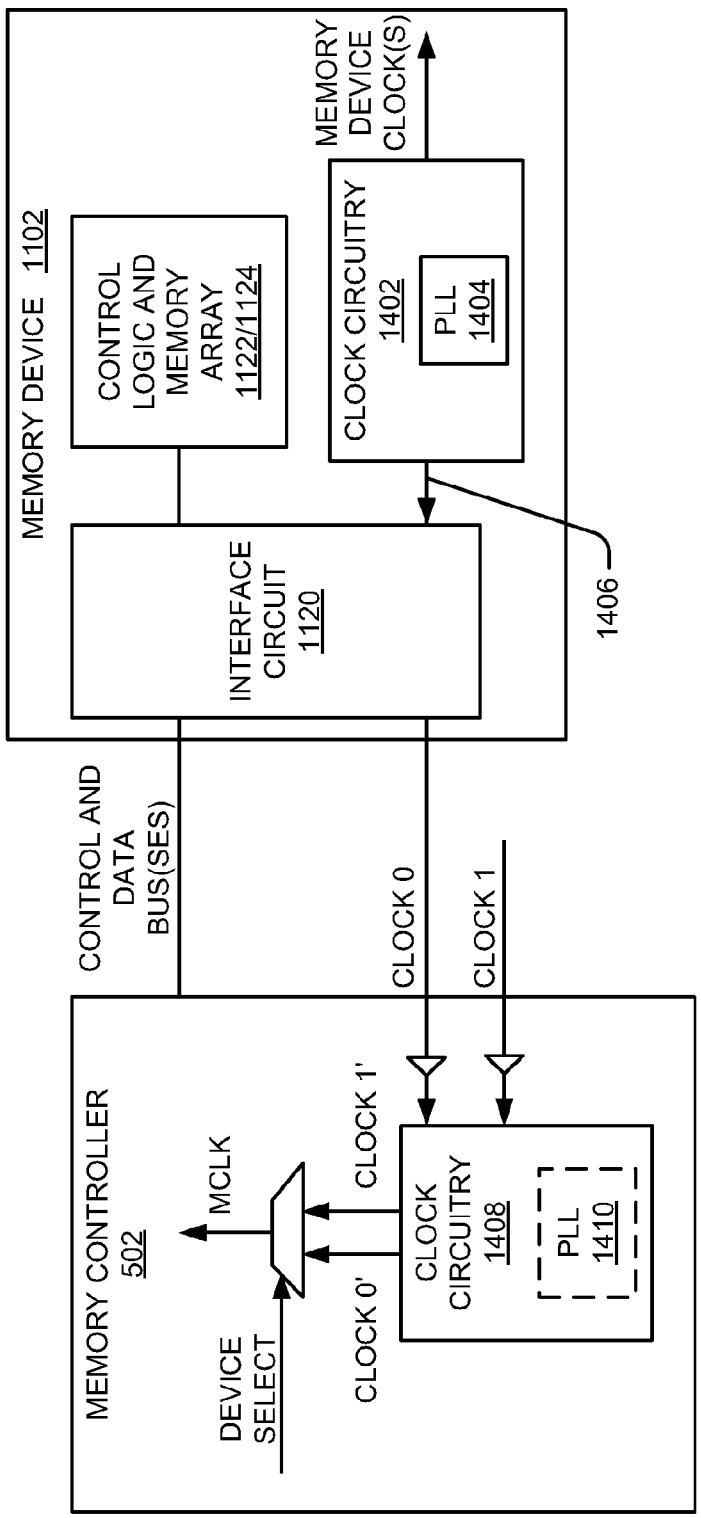
FIG. 14 is a simplified block diagram illustrating sample aspects of an embodiment of a memory system where memory devices provide clocks to a memory controller.

FIG. 14 illustrates an embodiment of a memory system where clock signals are generated by the memory devices. For example, clock circuitry 1402 of the memory device 1102 includes a PLL circuit 1404 that generates a clock signal at a specified frequency. In some aspects, this clock signal may be used to generate one or more clocks signals for use by the components (e.g., latches in the interface circuit 1120) of the memory device 1102.

The clock signal is also sent to the memory controller 502 via signal path 1406 and the interface circuit 1120 (which may simply provide a transmitter for the clock signal). The clock signal clock 0 and any other clock signals (e.g., clock 1) are thus received by receivers of the memory controller 502 which route the clock signals to clock circuitry 1408. The clock circuitry 1408 may then process the received signals to provide the clocks (e.g., clock 0' and clock 1') for use by the memory controller 502. For example, the clock circuitry 1408 may incorporate circuitry to impart a phase delay on the clock, may incorporate circuitry (e.g., a PLL 1410) to clean-up the clock, or may incorporate other types of circuitry (e.g., to passively pass the clock).

Figure 15:
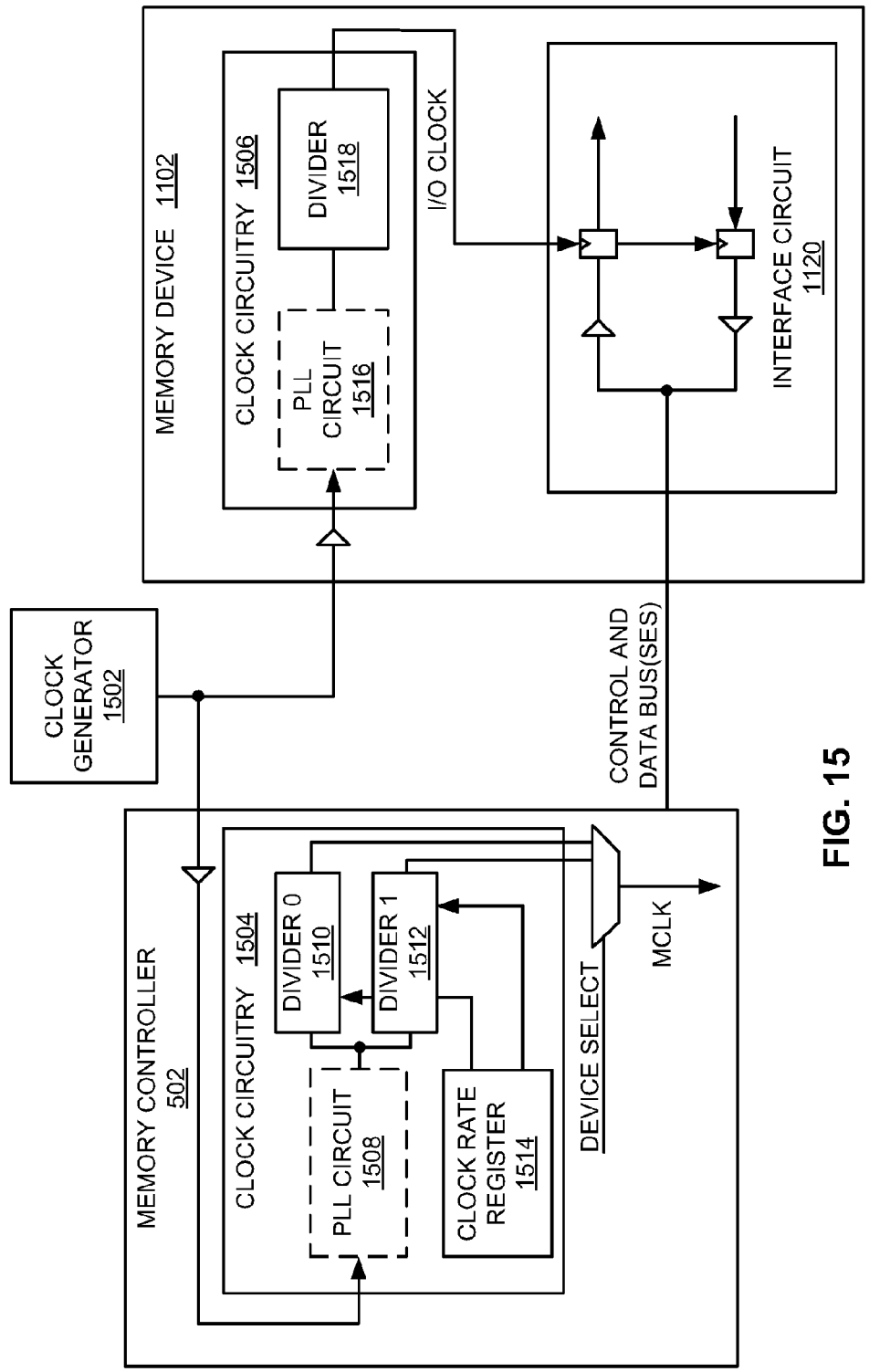
FIG. 15 is a simplified block diagram illustrating sample aspects of an embodiment of a memory system where an external clock generator provides a clock for a memory controller and memory devices.

FIG. 15 illustrates an embodiment of a memory system where a clock signal is generated by a clock generator 1502 that is external to the memory controller 502 and the memory devices. This clock signal is sent to clock circuitry 1504 of the memory controller 502 and clock circuitry of the memory devices (e.g., clock circuitry 1506 of the memory device 1102) for use in data transfer operations.

The clock circuitry 1504 may optionally process the received clock signal (e.g., to impart a phase delay on the clock, to clean-up the clock using a PLL circuit 1508). In any event, either the received clock signal or the processed clock signal is provided to dividers 1510 and 1512 to provide the different clocks (e.g. clock 0 and clock 1) for accesses of different types of memory devices. As discussed above, the clock circuitry 1504 may employ a register 1514 for configuring the dividers 1510 and 1512.

The clock circuitry 1506 also may optionally process the received clock signal (e.g., impart a phase delay on the clock, clean-up the clock using a PLL circuit 1516). Thus, either the received clock signal or the processed clock signal is provided to a divider 1518, if division is needed, to provide the clock (e.g. clock 0) for accessing the memory device 1102. As discussed herein, the clock circuitry 1506 may employ a register (not shown in FIG. 15) for configuring the divider 1518 or the divider 1518 may be configured in some other manner (e.g., preconfigured).

Figure 16:
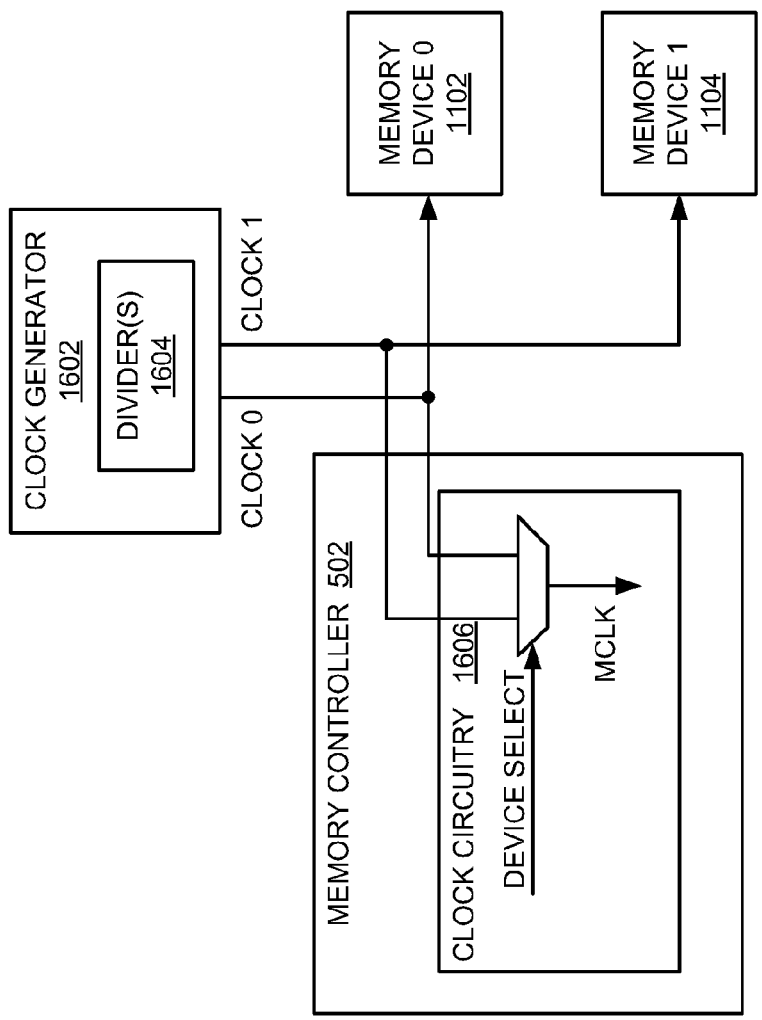
FIG. 16 is a simplified block diagram illustrating sample aspects of an embodiment of a memory system where an external clock generator provides a plurality of clocks for a memory controller and memory devices.

In some implementations a divider may be employed at an external clock generator (e.g., instead of at the memory controller and memory devices). FIG. 16 illustrates an example of this type of implementation. Here, a clock generated at the clock generator 1602 is provided to one or more dividers 1604 to generate multiple clocks signals (e.g., clock 0 and clock 1). These clock signals are then provided to the memory controller 502 and the memory devices 1102 and 1104 and used as described herein. For example, clock circuitry 1606 of the memory controller 502 may select one of these clock signals for its internal data transfer clocking operations based on the device select signal.

Figure 17:
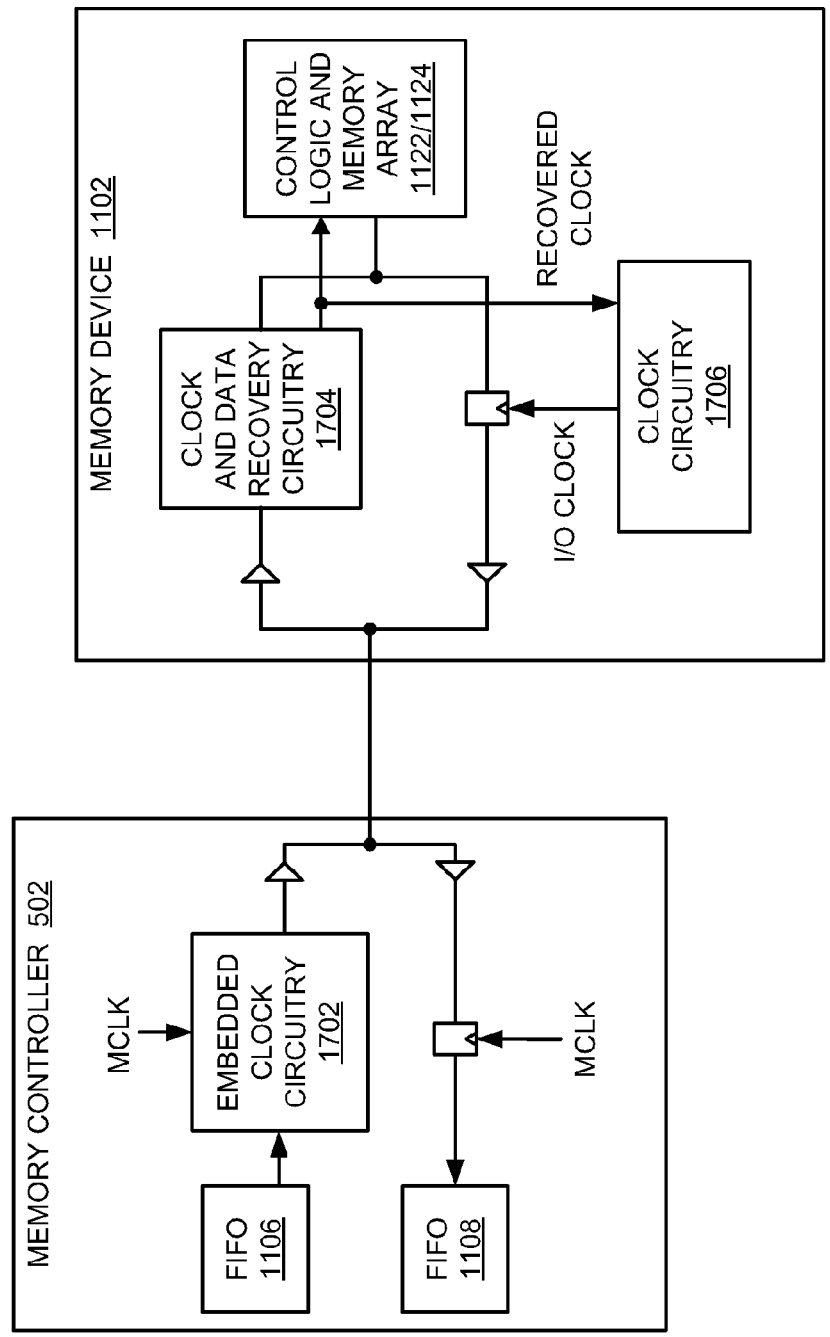
FIG. 17 is a simplified block diagram illustrating sample aspects of an embodiment of a memory system where a memory device utilizes clock and data recovery to recover a clock and data from an embedded clock and data signal received from a memory controller.

In some implementations a clock signal may be passed between components in a memory system via an embedded clock and data signal. FIG. 17 illustrates an example where the memory controller 502 sends an embedded clock and data signal to the memory device 1102, while FIG. 18 illustrates an example where the memory device 1102 sends an embedded clock and data signal to the memory controller 502.

In FIG. 17, data from a transmit FIFO 1106 is provided to embedded clock circuitry 1702 that embeds a clock (e.g., MCLK) with the data to provide an embedded clock and data signal. This signal is then sent to the memory device 1102 where clock and data recovery circuitry 1704 extracts the data and recovers the clock from the received signal. The recovered clock may then be provided to clock circuitry 1706 that optionally processes the recovered clock (e.g., adjusts the phase or cleans up the signal) and uses the recovered clock to provide an I/O clock. This I/O clock may be used, for example, to send data to the memory controller 502.

Figure 18:
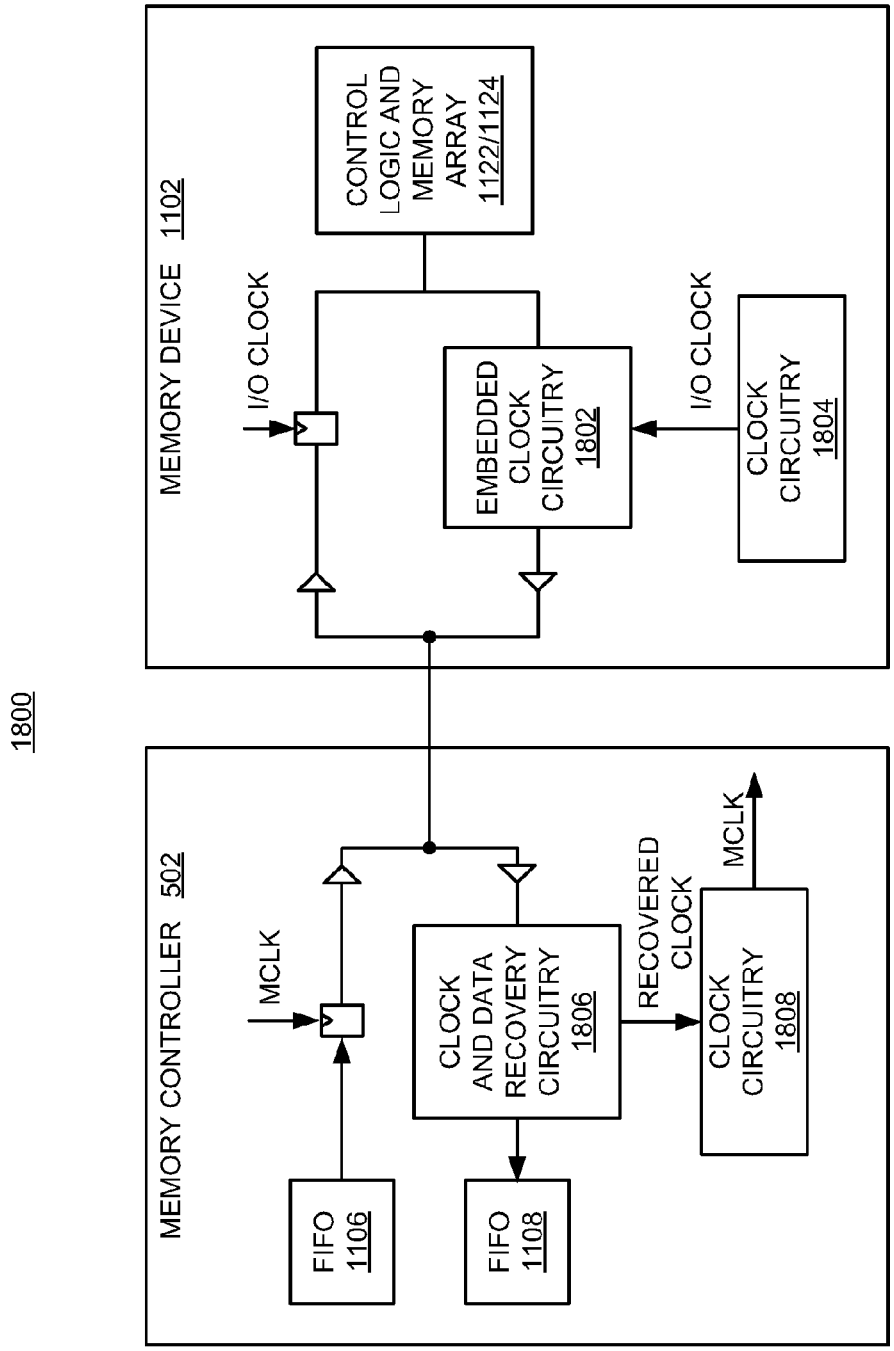
FIG. 18 is a simplified block diagram illustrating sample aspects of an embodiment of a memory system where a memory controller utilizes clock and data recovery to recover a clock and data from an embedded clock and data signal received from a memory device.

In FIG. 18, data read from a memory array of the memory device 1102 is provided to embedded clock circuitry 1802 that embeds a clock (e.g., an I/O clock generated by clock circuitry 1804) with the data to provide an embedded clock and data signal. This signal is then sent to the memory controller 502 where clock and data recovery circuitry 1806 extracts the data and recovers the clock from the received signal. The recovered clock may then be provided to a clock circuitry 1808 that optionally processes the recovered clock (e.g., adjusts the phase or cleans up the signal) and uses the recovered clock to provide a clock (e.g., MCLK). As discussed herein, MCLK may be used, for example, to send data to the memory device 1102.

Figure 19:
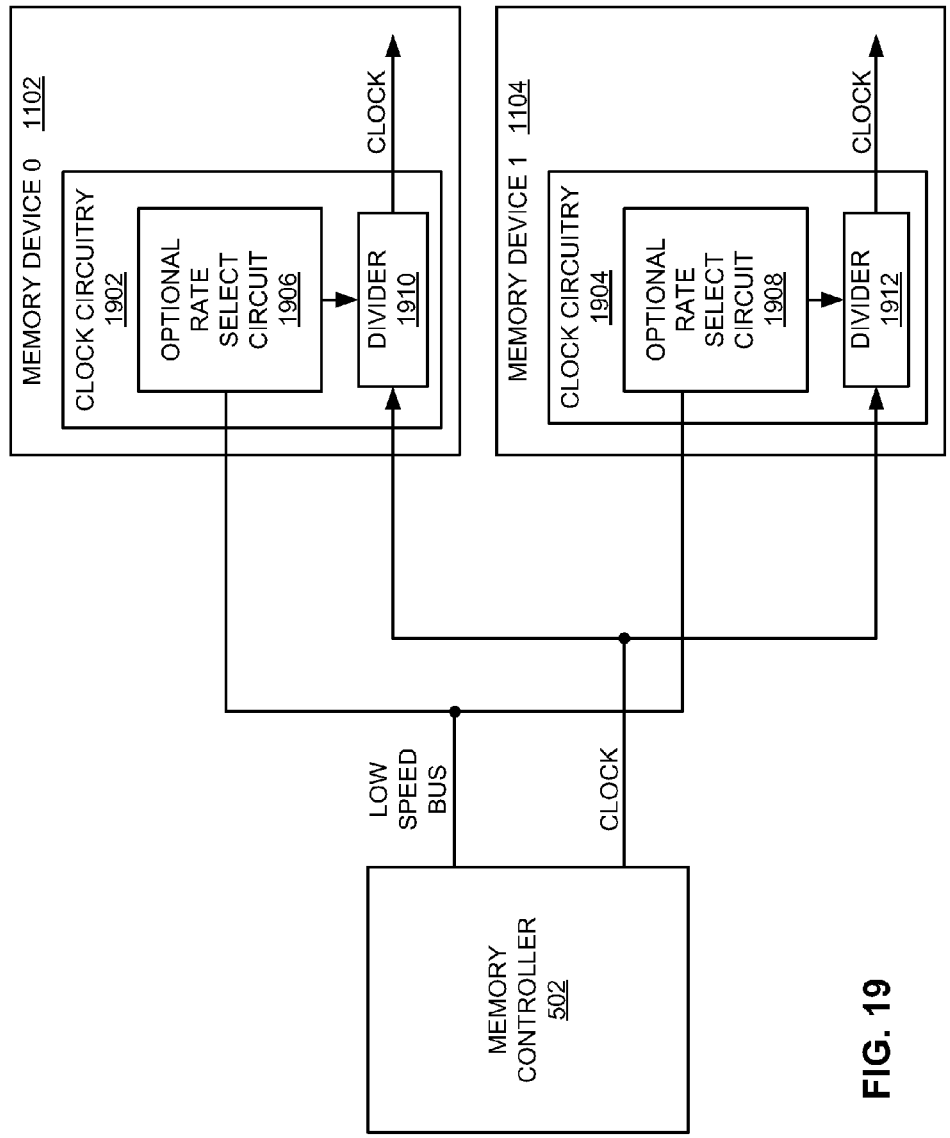
FIG. 19 is a simplified block diagram illustrating sample aspects of an embodiment of a memory system where different types of memory devices employ different dividers to divide a clock from an external device.

As mentioned above, in implementations where a memory device includes a clock divider, the divisor of that divider may be programmable. FIG. 19 illustrates one example of how such a divider may be programmed. In this case, a low speed bus is provided between the memory controller 502 and clock circuitry 1902 and 1904 of the memory devices 1102 and 1104, respectively. In this way, divisor information or other suitable information may be provided to rate select circuit 1906 and 1908 that control the dividers 1910 and 1912, respectively. In some implementations, a rate select circuit may comprise functionality that enables communication over the low speed bus and functionality (e.g., a data register) for storing divisor information.

In this example, the clock that provides the input for the dividers 1910 and 1912 is shown as being provided by the memory controller 502. It should be appreciated, however, that the clock may originate at some other entity (e.g., the clock generator of FIG. 15).

Figure 20:
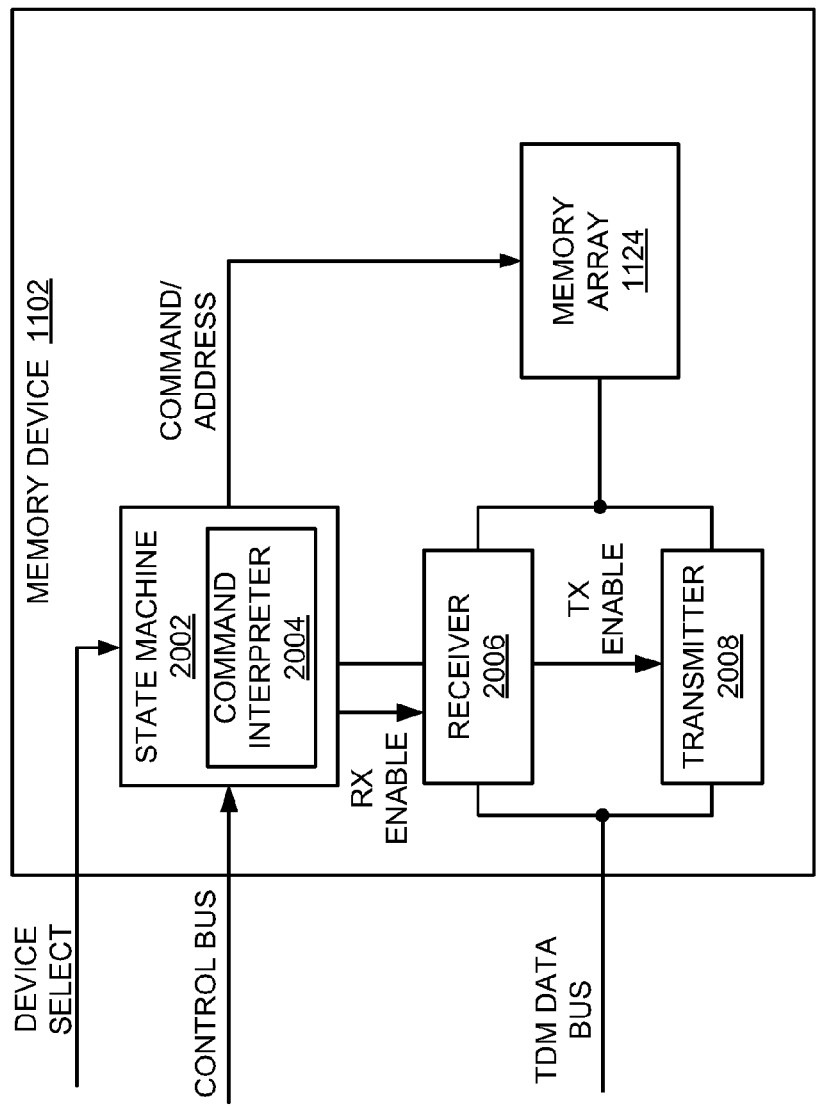
FIG. 20 is a simplified block diagram illustrating sample aspects of an embodiment of an enable/disable scheme for a memory device.
Figure 21:
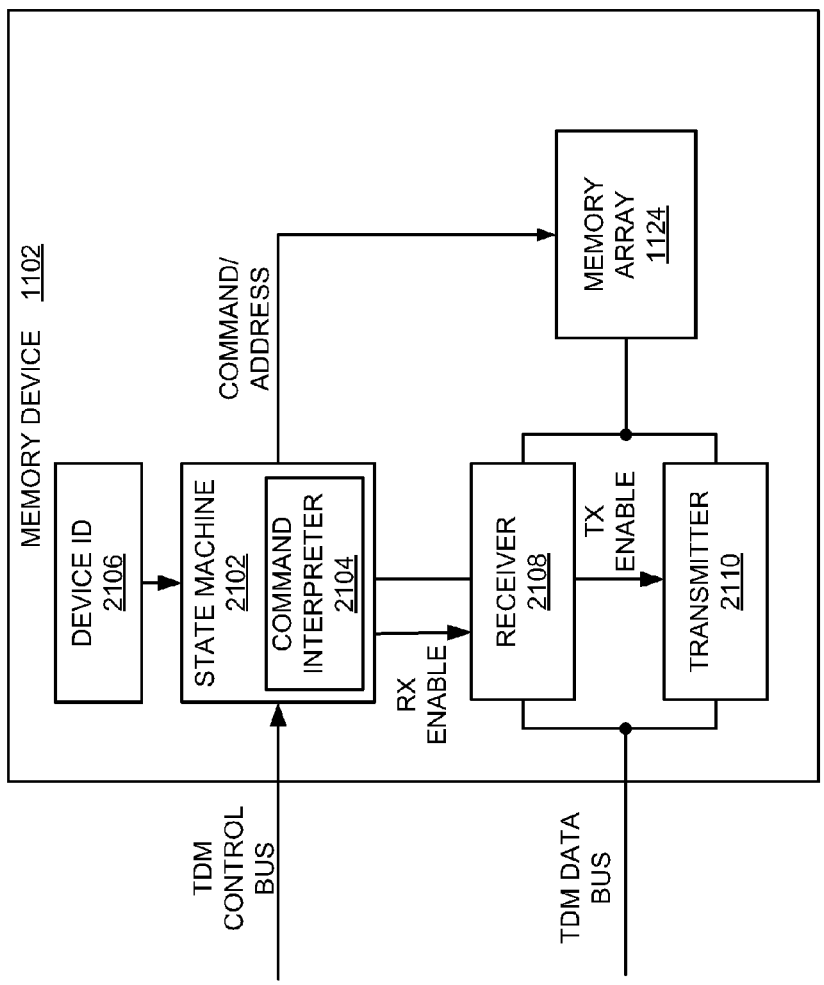
FIG. 21 is a simplified block diagram illustrating sample aspects of an embodiment of a command-based enable/disable scheme for a memory device.
Figure 22:
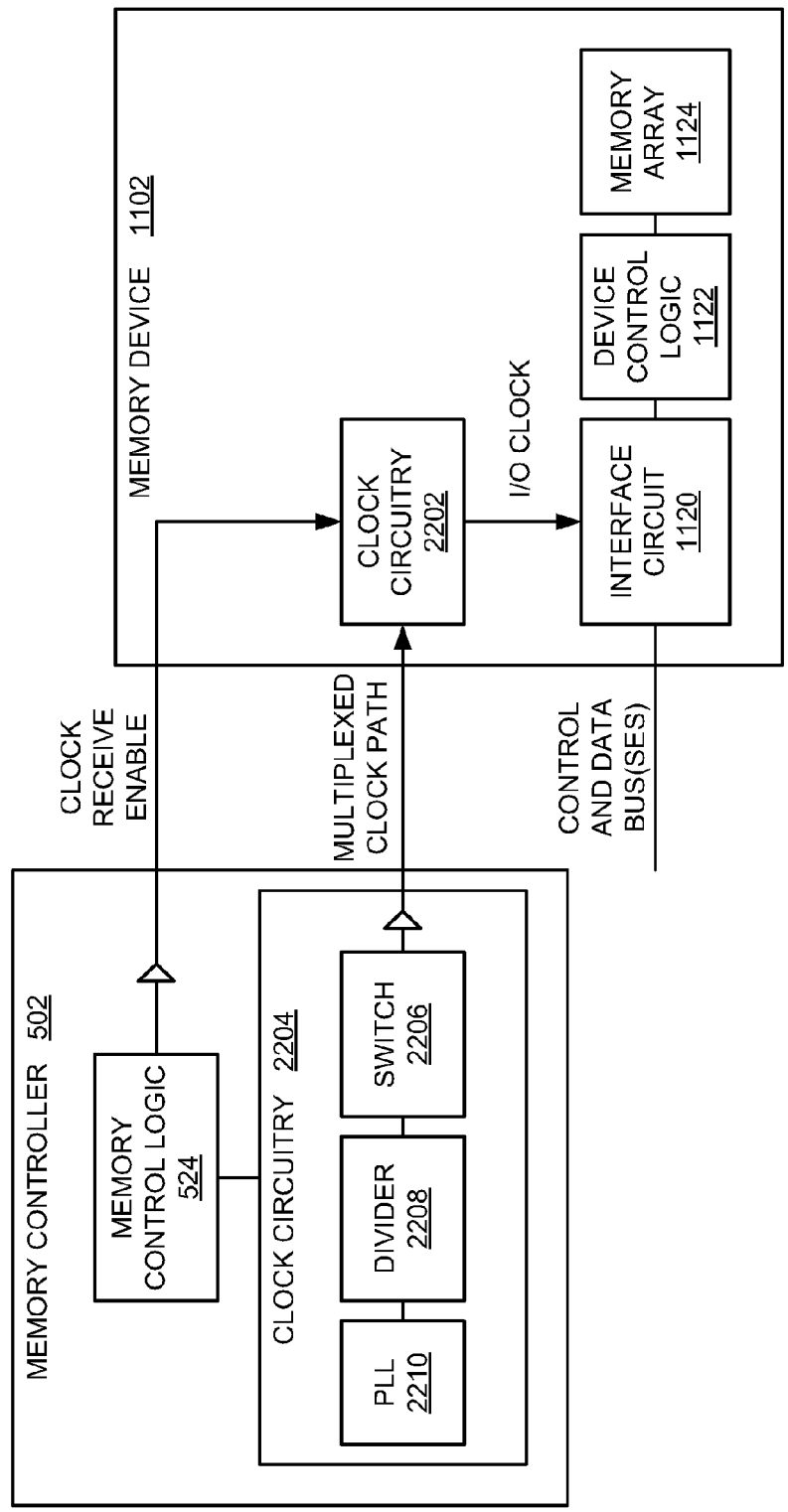
FIG. 22 is a simplified block diagram illustrating sample aspects of an embodiment of a memory system employing a multiplexed clock bus.

FIGS. 20-22 depict techniques that may be employed to selectively enable a memory device to operate on a time division multiplexed bus. Specifically, FIG. 20 illustrates an embodiment that uses a device select signal to enable a memory device, FIG. 21 illustrates an embodiment that uses command-based enablement of a memory device, and FIG. 22 illustrates an embodiment that employs a clock receive enable signal to enable reception of a time division multiplexed clock signal.

In FIG. 20, a state machine 2002 (e.g., of device control logic 1122) processes incoming commands on the control bus. For example, the state machine 2002 may comprise a command interpreter 2004 that identifies commands on the control bus and interprets the fields of the commands (e.g., as shown in FIGS. 8A-9B). To ensure that the memory device 1102 only interprets commands intended for that memory device, the memory controller may provide a device select signal that only enables the memory device 1102 when the memory controller is accessing the memory device 1102. For example, upon activation of the device select signal, the state machine 2002 may provide receive (RX) enable and/or transmit (TX) enable signals to a receiver 2006 and a transmitter 2008 (e.g., provided in the interface circuit 1120) of the memory device 1102. Conversely, upon deactivation of the device select signal, the state machine 2002 may deactivate the receive (RX) enable and/or transmit (TX) enable signals. In this way, it may be ensured that the memory device 1102 does not perform unintended writes to its memory array 1124 or output data on the TDM data bus at the wrong time (e.g., when another device is using the TDM data bus).

In FIG. 21, the memory device 1102 also includes a state machine 2102 (e.g., comprising a command interpreter 2104) that processes incoming commands on the control bus. In this case, however, the commands on the control bus may indicate whether a particular memory device type will be enabled on the TDM data bus. For example, as shown in FIGS. 8A and 8B, the commands may have chip select (CS) fields that identify the memory device type that will be enabled for a subsequent (e.g., the next) operation on the data bus. Thus, the state machine 2102 may determine whether the memory device will be enabled by comparing the chip select information with an identifier associated with the memory device 1102. In some implementations this identifier may take the form of a device identifier (device ID) 2106. Such an identity may be, for example, hardwired (e.g., via power and/or ground signals applied to specified pins on the memory device), programmed (e.g., in embodiments where the device identifier 2106 comprises a register), or configured in some other manner.

Upon determining that the memory device 1102 is to be enabled for an upcoming data transfer on the TDM data bus, the state machine 2102 may provide receive (RX) enable and/or transmit (TX) enable signals to a receiver 2108 and/or a transmitter 2110 (e.g., provided in the interface circuit 1120) of the memory device 1102. Conversely, at the end of the designated access, the state machine 2102 may deactivate the receive (RX) enable and/or transmit (TX) enable signals. In this way, it may be ensured that the memory device 1102 does not perform unintended writes to its memory array 1124 or output data on the TDM data bus at the wrong time (e.g., when another device is using the TDM data bus).

FIG. 21 also illustrates that the control bus may be time division multiplexed as discussed herein. That is, commands for one memory device may appear on the control bus during one period of time, and commands for another memory device may appear on the control bus during another period of time. Also as discussed herein, a common time division multiplexed control and data bus may be employed in some implementations. In either of these cases, the device select enablement of FIG. 20 or the command-based enablement of FIG. 21 may be employed to enable a memory device at the proper time. In the case of command-based enablement, however, provisions may need to be made to ensure that the memory devices do not access the multiplexed bus at the wrong time. For example, certain times may be designated for all memory devices to listen for control information. As another example, specific memory devices may be scheduled to listen to the bus at certain times.

Referring now to FIG. 22, in some implementations different clock signals (e.g., clock 0 and clock 1) may be time division multiplexed over a common (i.e., the same) signal path (e.g., a single trace or a trace pair). In such a case, the memory controller 502 (e.g., the memory control logic 524) may provide a clock receive enable signal to enable a given memory device to know when it may listen for a clock signal on the multiplexed clock path. Once the clock receive enable signal is active, clock circuitry 2202 on the memory device 1102 may provide a clock (e.g., I/O clock) based on the signal present on the multiplexed clock path. As discussed herein, the clock circuitry 2202 may process the received clock signal (e.g., to provide delay or clean up the signal) to some extent.

FIG. 22 also describes, in a simplified manner, sample clock circuitry 2204 (e.g., a clock generator) that may be employed to provide multiplexed clock signals. In this example, the clock circuitry 2204 includes a switch 2206 (e.g., a multiplexer) that provides a clock signal at a given rate by selecting one of a plurality of different frequency signals. Here, the switch 2206 may be controlled by a rate control signal (e.g., a device select signal or other suitable signal provided by the device selection logic 602 as discussed above). Thus, by changing the rate control signal based on which type of memory device is currently being accessed, the clock circuitry 2204 may be controlled to provide time division multiplexed clock signals. As discussed above at FIG. 10, a delay may be invoked after switching clock frequencies to provide adequate settling time for the clock signal. In the example of FIG. 22, the different frequency signals are provided to the switch by a divider 2208 that provides different divided clock signals based on a clock signal from a master clock source such as a PLL 2210.

As mentioned above, a memory controller may provide write data destined for different types of memory devices at a common clock rate and may process received data at that same clock rate. In such a case, the construction and operation of the memory controller may be simplified since the memory controller may use the same signal processing path to handle data destined for or received from any type of memory device, without having to repeatedly change the clock that drives this processing. FIGS. 23-26 describe examples of how rate adaptation may be achieved in implementations where the memory controller processes data at a rate that is different than the rate at which data is written to or read from a memory device. For convenience, the following discussion described rate adaptation that may be performed for data that is routed over a shared bus. It should be appreciated that these techniques also may be used to provide rate adaptation for control information.

FIGS. 23 and 24 describe an example where rate adaptation is provided by adding duplicate data to a write data stream and removing duplicate data from a read data stream, respectively. Such a scheme may be advantageously employed in an implementation where the clock rate of a fast clock is an integer multiple of the clock rate of a slow clock.

In FIG. 23, a memory controller (e.g., components of the memory control logic 524 and interface circuit 526 of FIG. 5) processes fast rate data (A0-C0) and slow rate data (A1-C1) at the same rate. For example, the fast rate data may be destined for a memory device that receives data at a rate corresponding to the 2× clock. Conversely, the slow rate data may be destined for a memory device that receives data at a rate corresponding to the 1× clock. In this example, the memory controller provides write data destined for the two devices at the 2× rate. In this way, this stage of the memory controller may process data in the same way irrespective of rate at which the data will ultimately be sent to a memory device.

In this case, the fast rate data may be output on the shared bus at the same rate. That is, there is no rate adaptation processing for the fast rate data.

For the slow rate data, on the other hand, a rate adaptation circuit 2302 inserts duplicate data at the 2× clock rate into the data stream. As a result, as represented by the blocked data pairs (e.g., A1, A1) on the upper right hand side of FIG. 23, the memory controller outputs the slow rate data at the 1× clock rate. In other words, in some aspects the duplicate data comprises data that is repeated over a plurality of consecutive clock cycles at a first clock rate to provide data at a second, slower, clock rate.

FIG. 24 describes complementary operations for read data. Here, the memory controller (e.g., components of the interface circuit 526 of FIG. 5) receives the fast rate data at the 2× clock rate and the slow rate data at the 1× clock rate. In this case, the memory controller samples both the fast rate data and the slow rate data at the 2× clock rate. Consequently, this stage of the memory controller may process data in the same way (e.g., at the same rate) irrespective of the rate at which the data was received from a memory device.

In this case, the fast rate data may be passed on (e.g., sent to the system processor) at the same rate. That is, there is no rate adaptation processing for the fast rate data.

For the slow rate data, upon sampling with the 2× clock, the resulting data stream will include duplicate data (e.g., an extra A1 sample) at the 2× clock rate. Accordingly, a rate adaptation circuit 2402 discards (e.g., ignores) the duplicate data in the data stream to provide the original data at the 2× rate.

The rate adaptation circuits of FIGS. 23 and 24 may be implemented in various ways. For example, the rate adaptation circuit 2302 may comprise a buffer (e.g., a FIFO controlled by the memory control logic 524) that buffers data at one rate, and performs double reads at that same rate to provide the duplicate data. Conversely, the rate adaptation circuit 2402 may comprise a buffer (e.g., a FIFO controlled by the memory control logic 524) that buffers data at one rate, and reads every other memory location at that same rate to remove the duplicate data.

A rate adaptation circuit may be controlled in various ways as well. For example, in some cases all data may be routed through a rate adaptation circuit, however, the rate adaptation circuit may be selectively enabled to perform rate adaptation based on a control signal that indicates whether the data being processed requires rate adaptation (e.g., the data is slow rate data). Such a control signal may be generated by, for example, the device selection logic 602 of FIG. 6 that may identify slow rate data based on the target memory device (e.g., based on the memory address).

Figure 25:
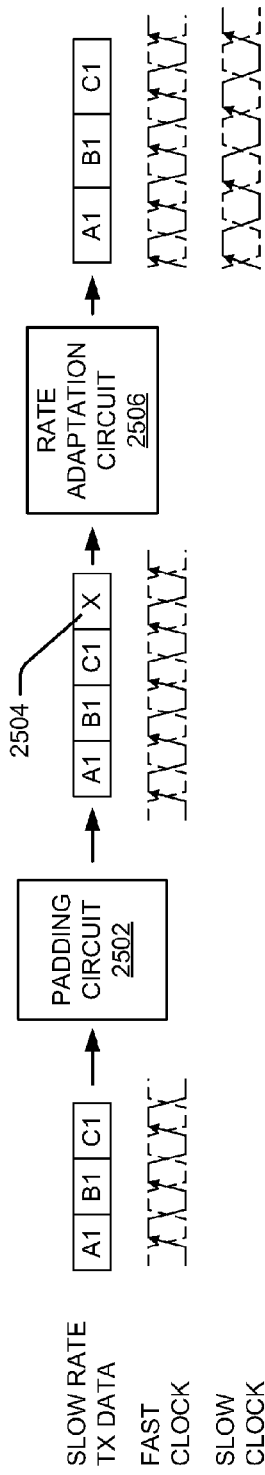
FIG. 25 is a simplified diagram of another embodiment of rate adaptation scheme for a write operation.
Figure 26:
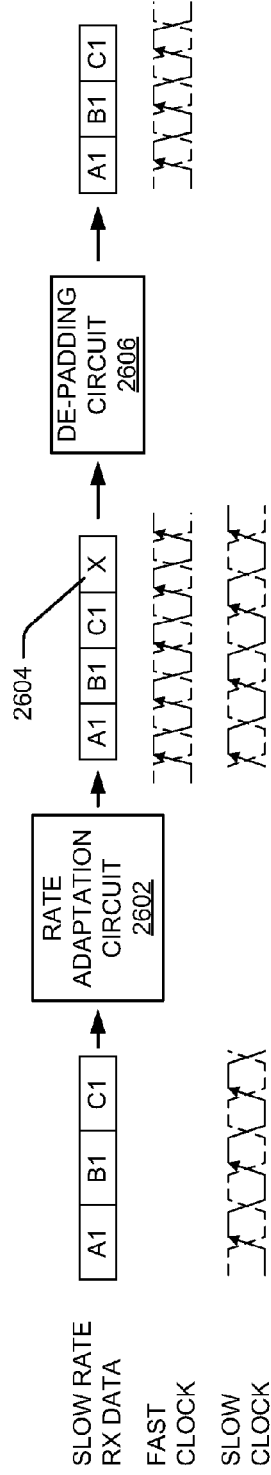
FIG. 26 is a simplified diagram of another embodiment of rate adaptation scheme for a read operation.

FIGS. 25 and 26 describe an example where rate adaptation is provided by inserting timing bubbles data into a write data stream and removing timing bubbles from a read data stream, respectively. Such a scheme may be employed in an implementation where the clock rate of a fast clock is or is not an integer multiple of the clock rate of a slow clock. As in the example of FIGS. 23 and 24, the fast rate data is not subjected to rate adaptation in this scheme. Consequently, the fast rate data will not be discussed in detail here.

In FIG. 25, a memory controller (e.g., components of the memory control logic 524 and interface circuit 526) processes slow rate data (A1-C1) at the fast clock rate (e.g., 1.33×). For the slow rate data, a padding circuit 2502 adds a timing bubble at the fast clock rate. This timing bubble may comprise dummy (e.g., "don't care" or invalid) data 2504. Thus, as above, at this stage the memory controller may process data in the same way (e.g., at the same rate) irrespective of the rate at which the data will ultimately be sent to a memory device.

A rate adaptation circuit 2506 then retimes the data including the timing bubble to provide data at the slow clock rate (e.g., 1×). Consequently, the memory controller outputs the slow rate data at the slow clock rate.

FIG. 26 describes complementary operations for read data. Here, the memory controller (e.g., components of the interface circuit 526) receives the slow rate data at the slow clock rate. A rate adaptation circuit 2602 then retimes the data (optionally inserting a timing bubble with dummy data 2604) to provide data at the fast clock rate. Consequently, at subsequent stages of the memory controller, the memory controller may process data in the same way irrespective of rate at which the data was received from a memory device. Here, dummy data refers to a data value that is present during a timing bubble. Thus, the dummy data comprises data that is not to be used (e.g., ignored or discarded) by the entity that receives the dummy data. In other words, the value of the dummy data may be considered to be "don't care" because it has no effect on the operation of the memory system.

In cases where the dummy data 2604 is inserted into the receive data stream, a de-padding circuit 2606 may be employed to remove the dummy data 2604. Accordingly, the data stream without the timing bubble or dummy data is provided at the fast rate (e.g., and sent to a system processor that requested the data).

The circuits of FIGS. 25 and 26 may be implemented in various ways. For example, the padding circuit 2502 may comprise a buffer (e.g., a FIFO controlled by the memory control logic 524) that buffers data at one rate, reads the data out at that same rate, and reads out (or multiplexes in) dummy data at defined intervals. Also, the rate adaptation circuit 2506 may comprise a buffer (e.g., a FIFO controlled by the memory control logic 524) that buffers data at one rate (e.g., 1.33×), and reads data out at a different rate (e.g., 1×), while skipping defined data locations to avoid reading out the dummy data. The rate adaptation circuit 2602 may comprise a buffer (e.g., a FIFO controlled by the memory control logic 524) that buffers data at one rate (e.g., 1×), and reads data out at a different rate (e.g., 1.33×), while optionally reading out (or multiplexing in) dummy data at defined intervals. Finally, the de-padding circuit 2606 may comprise a buffer (e.g., a FIFO controlled by the memory control logic 524) that buffers data at one rate, and reads data out at that same rate, while optionally skipping defined data locations to avoid reading out the dummy data.

The circuits of FIGS. 25 and 26 may be controlled in various ways as well. For example, in some cases all data may be routed through a rate adaptation circuit and a padding or de-padding circuit, however, these circuits may be selectively enabled to perform rate adaptation based on a control signal that indicates whether the data being processed requires rate adaptation in a similar manner as discussed above in conjunction with FIGS. 23 and 24.

It should be appreciated that rate adaptation may be implemented through the use of schemes other than those described above. For example, in cases where data is sent on a parallel bus, one component may send data on a portion of the bus signal paths to provide data at a slower rate.

Figure 27:
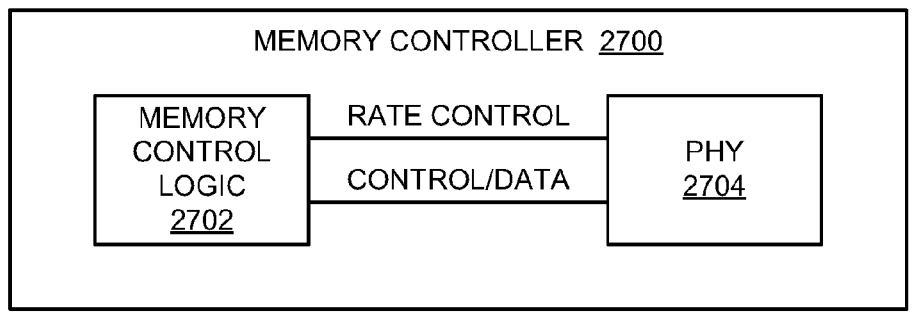
FIG. 27 is a simplified block diagram of an embodiment of a memory controller.

The rate control operations described herein may be implemented in different functional blocks of a memory controller in different embodiments. For example, FIG. 27 illustrates that a memory controller 2700 may comprise a memory control logic block 2702 and a physical interface (PHY) block 2704. As discussed above, in some implementations the PHY block 2704 may simply perform operations such as driving channels, receiving bits, serializing, and deserializing. However, in other implementations the PHY block 2704 may perform rate adaptation operations. For example, control information and data may be transferred between the memory control logic block 2702 and the PHY block 2704 at a given rate. When data is to be sent to or received from a given memory device, the memory control logic block 2702 may send a rate control signal to the PHY block 2704. The PHY block may then perform rate adaptation operations to output or receive the data at the appropriate rate.

Figure 28:
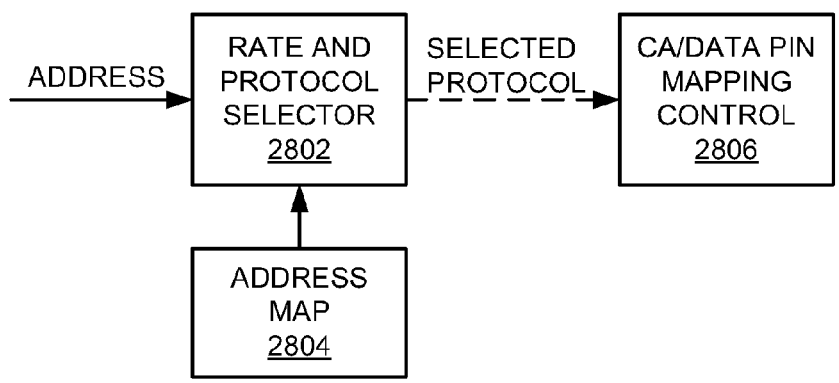
FIG. 28 is a simplified block diagram of an embodiment of selection logic.

FIG. 28 illustrates, in a simplified manner, a sample selection logic circuit 2800 (e.g., corresponding to the device selection logic 602 of FIG. 6). In this example, a rate and protocol selector 2802 selects a rate and protocol to be used for a given memory access based on the address associated with the memory access (e.g., as provided by a system processor in a read request or a write request). Here, the selection logic circuit 2800 includes an address map that maps different address ranges to different types of memory devices and to the data rates and protocols that should be used when accessing those types of memory devices (i.e., when accessing addresses within those ranges).

As mentioned above, in some implementations the use of different protocols may involve re-mapping the I/O pins and, hence, the corresponding shared bus signal paths that are used to carry control signals and/or data signals. Accordingly, a memory controller (e.g., the components of the memory control logic 524 and interface circuit 526) may include a mapping control circuit 2806 that configures the mapping between control signals and signals paths and/or between data signals and signal paths based on a selected protocol (e.g., based on which type of memory device is currently being accessed). For example, the memory controller may send data over a given signal path when accessing a first type of memory device and send control information over that same signal path when accessing a second type of memory device. As another example, the memory controller may send a first type of control information over a given signal path when accessing a first type of memory device and send a second type (but not the first type) of control information over that same signal path when accessing a second type of memory device.

The mapping control circuit 2806 may take various forms. In some cases the mapping control circuit 2806 may include one or more multiplexer circuits, each of which selectively couples one of a set of internal signal paths of a memory controller to a given I/O pin of the memory controller. In some cases, this mapping may be achieved by simply writing different information (e.g., control or data) to a particular output register or interpreting received information differently (e.g., interpret as control or data).

Figure 29:
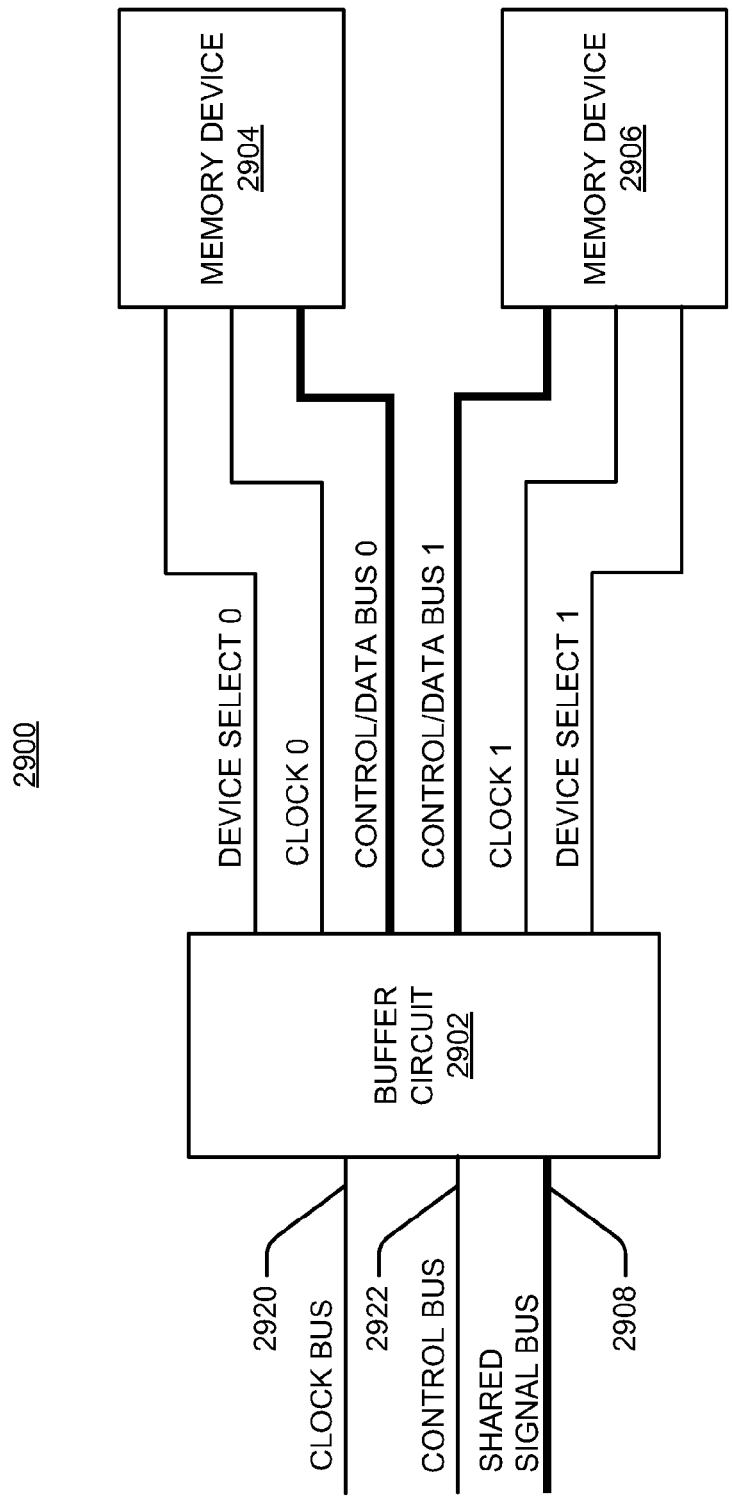
FIG. 29 is a simplified block diagram of an embodiment of a memory apparatus employing a buffer circuit.

FIG. 29 illustrates an embodiment of a memory apparatus 2900 (e.g., a memory module) that includes a buffer circuit 2902 that routes signals between the system busses (e.g., the clock bus 520, the control bus 522, and the shared signal bus 508) and memory devices 2904 and 2906. In some aspects a buffer circuit may comprise an integrated circuit that acts as an interface between a memory apparatus connector interface (not shown) and integrated circuit memory devices. In various implementations the buffer circuit 2902 may be configured to perform one or more of isolating, storing, routing, or translating signals for the memory devices.

As shown in FIG. 29, the buffer circuit 2902 may provide bus multiplexing and demultiplexing. For example, the buffer circuit 2902 may demultiplex the clock bus 520 and provide dedicated clock signals (clock 0 and clock 1) for each memory device 2904 and 2906. In addition, the buffer circuit 2902 may demultiplex the control bus 522 and provide dedicated control signals (e.g., device select 0 and device select 1) for each memory device 2904 and 2906. Also, the buffer circuit 2902 may demultiplex the shared signal bus 508 and provide dedicated busses (e.g., control/data bus 0 and control/data bus 1) for each memory device 2904 and 2906.

The teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

A controller device (e.g., an integrated circuit incorporating controller functionality) and a memory device (e.g., an integrated circuit incorporating a memory core) as taught herein may take various forms. For example, a controller device may comprise a memory controller chip, a processor chip that includes controller functionality, or some other suitable device. In some aspects a memory device may comprise a semiconductor integrated circuit device that includes a set of storage cells, which may collectively provide a memory array or a portion of a memory array.

Examples of different memory types (i.e., memory technologies) that may be employed in accordance with the teachings herein include, without limitation, volatile memory devices, nonvolatile memory devices, flash memory, dynamic RAM (DRAM), resistive RAM (RRAM), magnetoresistive RAM (MRAM), phase change memory (PCM), and static RAM (SRAM). Various characteristics of these memory types may be configured to facilitate using these memory types together over a shared bus as taught herein. For example, in some implementations the different types of memory may use identical protocols, signaling levels and pin outs. In other implementations, however, one or more of these characteristics may be different between the different memory types.

A memory system as taught herein may be used in a variety of applications. For example, such a memory system may be incorporated into a portable device, a mobile phone, a computer graphics card, a videogame console, a printer, a personal computer, a server, a processing system (e.g., a CPU device), or some other apparatus that utilizes data storage.

It also should be appreciated that the various structures and functions described herein may be implemented in various ways and using a variety of apparatuses. For example, an apparatus (e.g., a device) may be implemented by various hardware components such a processor, a controller, a state machine, logic, or some combination of one or more of these components. In some aspects, an apparatus or any component of an apparatus may be configured to provide functionality as taught herein by, for example, manufacturing (e.g., fabricating) the apparatus or component so that it will provide the functionality, by programming the apparatus or component so that it will provide the functionality, or through the use of some other suitable means.

In some embodiments, code including instructions (e.g., software, firmware, middleware, etc.) may be executed on one or more processing devices to implement one or more of the described functions or components. The code and associated components (e.g., data structures and other components by the code or to execute the code) may be stored in an appropriate data memory that is readable by a processing device (e.g., commonly referred to as a computer-readable medium). In some embodiments an apparatus constructed in accordance with the teachings herein may comprise a circuit description stored on a machine-readable media. Such a circuit description may implement, for example, one or more functions or components as taught herein.

The recited order of the blocks in the processes disclosed herein is simply an example of a suitable approach. Thus, operations associated with such blocks may be rearranged while remaining within the scope of the present disclosure. Similarly, the accompanying method claims present operations in a sample order, and are not necessarily limited to the specific order presented.

The components and functions described herein may be connected or coupled in various ways. The manner in which this is done may depend, in part, on whether and how the components are separated from the other components. In some embodiments some of the connections or couplings represented by the lead lines in the drawings may be in an integrated circuit, on a circuit board or implemented as discrete wires, or in some other way.

The signals discussed herein may take various forms. For example, in some embodiments a signal may comprise electrical signals transmitted over a wire, light pulses transmitted through an optical medium such as an optical fiber or air, or RF waves transmitted through a medium such as air, etc. In addition, a plurality of signals may be collectively referred to as a signal herein. The signals discussed above also may take the form of data. For example, in some embodiments an application program may send a signal to another application program. Such a signal may be stored in a data memory.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

While certain sample embodiments have been described above in detail and shown in the accompanying drawings, it is to be understood that such embodiments are merely illustrative of and not restrictive of the teachings herein. In particular, it should be recognized that the teachings herein may apply to a wide variety of apparatuses and methods. It will thus be recognized that various modifications may be made to the illustrated and other embodiments as taught herein, without departing from the broad inventive scope thereof. In view of the above it will be understood that the teachings herein are not limited to the particular embodiments or arrangements disclosed, but are rather intended to cover any changes, adaptations or modifications which are within the scope of the appended claims.

What is claimed is:

1. A memory controller, comprising:
   clock circuitry configured to provide clock signals having different clock rates for different types of memory devices; and
   an interface circuit configured to time division multiplex data destined for the different types of memory devices on a shared signal bus such that the data is output at the different clock rates for the different types of memory devices, the interface circuit also configured to provide first write data at a first one of the clock rates for write operations directed to a first type of memory device of the different types of memory devices, wherein the first type of memory device is configured to transmit and receive over the shared signal bus at the first clock rate and to provide second write data at the first clock rate for write operations directed to a second type of memory device of the different types of memory devices, wherein the second type of memory device is configured to transmit and receive over the shared signal bus at a second one of the clock rates that is slower than the first clock rate, and a portion of the second write data comprises dummy data.

2. The memory controller of claim 1, wherein the interface circuit is further configured to select different instruction protocols for writing the data to the different types of memory devices based on a mapping that maps the different types of memory devices to the different instruction protocols.

3. The memory controller of claim 1, wherein:
the clock signals comprise a first clock signal and a second clock signal;
the first clock signal operates at a first native clock rate associated with a first one of the memory device types;
the second clock signal operates at a second native clock rate associated with a second one of the memory device types; and
the first native clock rate is different than the second native clock rate.

4. The memory controller of claim 1, wherein the first clock rate is an integer multiple of the second clock rate.

5. The memory controller of claim 4, wherein
the second write data includes data that is repeated over a plurality of consecutive clock cycles at the first clock rate to provide data at the second clock rate.

6. The memory controller of claim 5, wherein the interface circuit is further configured to:
output the first write data at the first clock rate on the shared signal bus by outputting each instance of the first write data for a single clock cycle based on the first clock rate; and
output the second write data at the second clock rate by outputting data repeated over a plurality of consecutive clock cycles of the first clock rate during a single clock cycle based on the second clock rate.

7. The memory controller of claim 4, wherein the interface circuit further comprises:
a receiver configured to receive first data sent by the first type of memory device at the first clock rate and to receive second data sent by the second type of memory device at the second clock rate; and
at least one latch configurable to sample the first data at a first clock rate and to sample the second data at the first clock rate.

8. The memory controller of claim 4, wherein the interface circuit further comprises:
at least one latch configurable to sample first read data at the first clock rate during read operations from the first type of memory device and to sample second read data at the first clock rate during read operations from the second type of memory device, wherein the second read data includes data that is repeated over a plurality of consecutive clock cycles at the first clock rate to provide data at the second clock rate; and
a rate adaptation circuit configured to process the sampled second read data to provide read data that does not include the data that is repeated over a plurality of consecutive clock cycles.

9. The memory controller of claim 1, further comprising a rate adaptation circuit configured to buffer the second write data at the first clock rate and read out the buffered data at the second clock rate to provide write data at the second clock rate for the shared signal bus, wherein the write data at the second clock rate does not include the dummy data.

10. The memory controller of claim 1, wherein the interface circuit is further configured to time multiplex the data with control information destined for the different types of memory devices over the shared signal bus.

11. The memory controller of claim 1, wherein:
the shared signal bus comprises a shared data bus; and
the interface circuit is further configured to send control information to the different types of memory devices on a shared control bus in a time division multiplexed manner.

12. The memory controller of claim 11, wherein the interface circuit is further configured to:

send control information to a first type of memory device of the different types of memory devices at a first rate; and
send control information to a second type of memory device of the different types of memory devices at a second rate that is different than the first rate.

13. The memory controller of claim 1, further comprising device selection logic configured to select, for a given data transfer:
one of the different types of memory devices as a target memory device; and
one of the different clock rates based on a mapping of the different types of memory devices to the different clock rates.

14. The memory controller of claim 13, wherein the clock circuitry comprises a switch configured to provide one of the clock signals for the given data transfer by selecting, based on a signal from the device selection logic, one of a plurality of signals, each of which has a different frequency.

15. The memory controller of claim 1, wherein the interface circuit is further configured to use a signal path of the signal bus to:
send data to a first memory type of the different types of memory devices; and
send control information to a second memory type of the different types of memory devices.

16. A memory controller, comprising:
clock circuitry configured to provide clock signals having different clock rates for different types of memory devices; and
an interface circuit configured to time division multiplex data destined for the different types of memory devices on a shared signal bus such that the data is output at the different clock rates for the different types of memory devices;
the clock signals comprising a first clock signal, a second clock signal, and at least one other clock signal;
the first clock signal to operate at a first native clock rate associated with write operations for a first one of the memory device types;
the second clock signal to operate at a second native clock rate associated with read operations for the first one of the memory device types; and
the at least one other clock signal to operate at a third native clock rate associated with read and write operations for a second one of the memory device types.

17. A memory control apparatus, comprising:
means for providing clock signals having different clock rates for different types of memory devices; and
means for time division multiplexing data destined for the different types of memory devices on a shared signal bus such that the data is output at the different clock rates for the different types of memory devices;
means for providing first write data at a first one of the clock rates for write operations directed to a first type of memory device of the different types of memory devices, wherein the first type of memory device is configured to transmit and receive over the shared signal bus at the first clock rate, and
means for providing second write data at the first clock rate for write operations directed to a second type of memory device of the different types of memory devices, wherein the second type of memory device is configured to transmit and receive over the shared signal bus at a second one of the clock rates that is slower than the first clock rate, and a portion of the second write data comprises dummy data.

* * * * *